(12) United States Patent
Lim et al.

(10) Patent No.: US 10,098,103 B2
(45) Date of Patent: Oct. 9, 2018

(54) METHOD AND APPARATUS FOR MULTIUSER SUPERPOSITION TRANSMISSION

(71) Applicant: Samsung Electronics Co., Ltd, Gyeonggi-do (KR)

(72) Inventors: Chi-Woo Lim, Gyeonggi-do (KR);
Hyun-Kyu Yu, Gyeonggi-do (KR);
Jae-Won Kim, Seoul (KR);
Woo-Myoung Park, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 15/190,114

(22) Filed: Jun. 22, 2016

(65) Prior Publication Data

US 2016/0374060 A1    Dec. 22, 2016

Related U.S. Application Data

(60) Provisional application No. 62/182,958, filed on Jun. 22, 2015, provisional application No. 62/195,872, filed on Jul. 23, 2015.

(51) Int. Cl.
  *H04W 72/04*    (2009.01)
  *H04L 5/00*    (2006.01)
  *H04W 88/02*    (2009.01)

(52) U.S. Cl.
  CPC ......... *H04W 72/042* (2013.01); *H04L 5/0048* (2013.01); *H04W 88/02* (2013.01)

(58) Field of Classification Search
  CPC .... H04L 5/0048; H04W 72/042; H04W 88/02
  (Continued)

(56) References Cited

U.S. PATENT DOCUMENTS

| 2011/0188481 A1 | 8/2011 | Damnjanovic et al. |
| 2011/0199984 A1* | 8/2011 | Umesh .................. H04L 1/1829 370/329 |

(Continued)

FOREIGN PATENT DOCUMENTS

| EP | 1816756 A1 | 8/2007 |
| WO | 2010082775 A2 | 7/2010 |

(Continued)

OTHER PUBLICATIONS

Sen, Souvik. "Successive Interference Cancellation: A Back-of-the-Envelope Perspective" Oct. 2010. (Year: 2010).*

(Continued)

*Primary Examiner* — Stephen J Clawson

(57) ABSTRACT

A method and an apparatus for supporting multiuser superposition transmission. The method includes transmitting a signaling message including an indication of multiuser superposition transmission to a first UE among UEs scheduled for multiuser superposition transmission, transmitting, to the first UE, first DCI containing transmission information for the first UE and second DCI containing transmission information for at least one second UE among the UEs for multiuser superposition transmission, and transmitting a first downlink signal containing data for the first UE and a second downlink signal containing data for the second UE in a superposed manner on same resources.

22 Claims, 24 Drawing Sheets

MUST DCI Format (500)

| Field Name | Length (Bits) |
|---|---|
| 505 — MCS for Far UE (for CW-IC) | – |
| 510 — TM for Far UE | – |
| 515 — Precoding information for Far UE | – |

(58) Field of Classification Search
USPC .......................................................... 370/329
See application file for complete search history.

(56) References Cited

U.S. PATENT DOCUMENTS

| | | |
|---|---|---|
| 2011/0274102 A1 | 11/2011 | Kim et al. |
| 2014/0044091 A1 | 2/2014 | Kishiyama |
| 2015/0230249 A1* | 8/2015 | Nguyen ................ H04L 5/0094 370/329 |
| 2015/0358064 A1* | 12/2015 | Benjebbour ......... H04B 7/0452 370/329 |
| 2016/0037460 A1* | 2/2016 | Benjebbour .......... H04L 1/0003 370/329 |
| 2016/0065351 A1 | 3/2016 | Zhang et al. |

FOREIGN PATENT DOCUMENTS

| | | |
|---|---|---|
| WO | 2014046349 A1 | 3/2014 |
| WO | 2014179953 A1 | 11/2014 |

OTHER PUBLICATIONS

International Search Report dated Sep. 23, 2016 in connection with International Application No. PCT/KR2016/006612, 3 pages.
Written Opinion of the International Searching Authority dated Sep. 23, 2016 in connection with International Application No. PCT/KR2016/006612, 7 pages.

* cited by examiner

| Antenna | OMA Cell Rate [bps/Hz] | OMA Edge Rate [bps/Hz] | NOMA Cell Rate [bps/Hz] | NOMA Edge Rate [bps/Hz] | |
|---|---|---|---|---|---|
| 1Tx | 4.39 | 0.182 | 4.39 | 0.302 (+65%) | ～305 |
| 2Tx 2Rx | 7.2 | 0.254 | 7.22 | 0.423 (+67%) | |
| 4Tx 2Rx | 7.28 | 0.249 | 7.30 | 0.457 (+84%) | 310 |
| 4Tx 3Rx | 10.13 | 0.338 | 10.13 | 0.607 (+79%) | |
| 4Tx 4Rx | 12.41 | 0.417 | 12.42 | 0.738 (+77%) | |

FIG.3

| DCI Formats Used for Downlink Scheduling | | | | | | | | | | | |
|---|---|---|---|---|---|---|---|---|---|---|---|
| Field | | DCI Format | | | | | | | | | |
| | | 1 | 1A | 1B | 1C | 1D | 2 | 2A | 2B | 2C |
| Resource information | Carrier indicator | • | • | • | | • | • | • | • | • |
| | Resource block assignment type | 0/1 | 2 | 2 | 2' | 2 | 0/1 | 0/1 | 0/1 | 0/1 |
| | | • | • | • | | • | • | • | • | • |
| HARQ process number | | • | • | • | | • | • | • | • | • |
| First transport block | MCS | • | • | • | • | • | • | • | • | • |
| | RV | • | • | | | | • | • | • | • |
| | NDI | • | • | | | | • | • | • | • |
| Second transport block | MCS | | | | | | • | • | • | • |
| | RV | | | | | | • | • | • | • |
| | NDI | | | | | | • | • | • | • |
| Multi-antenna information | PMI confirmation | | | • | | | | | | |
| | Precoding information | | | • | | • | | | | |
| | Transport block swap flag | | | | | | • | • | | |
| | Power offset | | | | | • | | | | |
| | DM-RS scrambling | | | | | | | | • | |
| | # Layers/DM-RS scrambling | | | | | | | | | • |
| Downlink assignment index | | • | • | • | | • | • | • | • | • |
| PUCCH power control | | • | • | • | | • | • | • | • | • |
| Flag for 0/1A differentiation | | | • | | | | | | | |
| Padding (only if needed) | | (•) | (•) | (•) | | (•) | (•) | (•) | (•) | (•) |
| Identity | | • | • | • | • | • | • | • | • | • |

MUST DCI Format (500)

| Field Name | Length (Bits) |
|---|---|
| 505 — MCS for Far UE (for CW-IC) | – |
| 510 — TM for Far UE | – |
| 515 — Precoding information for Far UE | – |

MUST DCI Format (800)

| Field Name | Length (Bits) |
|---|---|
| 805 — MCS for Far UE (for CW-IC) | – |
| 810 — TM for Far UE | – |
| 815 — Precoding information for Far UE | – |
| 820 — C-RNTI for Far UE | – |

METHOD AND APPARATUS FOR MULTIUSER SUPERPOSITION TRANSMISSION

CROSS-REFERENCE TO RELATED APPLICATIONS AND CLAIM OF PRIORITY

The present application is related to and claims priority under 35 U.S.C. § 119(a) to U.S. Provisional Patent Application No. 62/182,958 filed on Jun. 22, 2015, and U.S. Provisional Patent Application No. 62/195,872 filed on Jul. 23, 2015, which are hereby incorporated by reference for all purposes as if fully set forth herein.

TECHNICAL FIELD

The present disclosure relates to a method and an apparatus for performing communication using Multiuser Superposition Transmission (MUST) in a cellular wireless communication system.

BACKGROUND

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mm Wave band (for example, 60 GHz band) is being considered. In the 5G communication system, technologies such as beamforming, massive Multi-Input Multi-Output (MIMO), Full Dimensional MIMO (FD-MIMO), array antenna, analog beam-forming, and large scale antenna are discussed to mitigate propagation path loss in the mm Wave band and increase propagation transmission distance.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation to improve the system network have been developed for the 5G communication system.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Non-Orthogonal Multiple Access (NOMA) corresponds to a technology for allowing a plurality of User Equipments (UEs) to jointly use the same non-orthogonal time/frequency resources, thereby improving system performance and increasing fairness of scheduling for the UEs. Compared to the NOMA, Orthogonal Frequency Multiple Access (OFDMA) used in a general communication system may be called Orthogonal Multiple Access (OMA).

In the NOMA system, a Base Station (BS) allocates the same time/frequency resources to a plurality of UEs and transmits signals to the UEs on the allocated time/frequency resources in a superposed manner. Such a transmission scheme is called Multiuser Superposition Transmission (MUST). Each of the UEs may reconstruct its own signal (that is, a desired signal) by performing Successive Interference Cancellation (SIC) to remove a signal of another terminal from received downlink signals.

For such a MUST operation, the UE needs additional control information to remove a signal of another UE from downlink signals received from the BS. Accordingly, developing a technology for transmitting additional information and signals needed for a more effective and efficient MUST operation to the UEs is needed.

SUMMARY

To address the above-discussed deficiencies, it is a primary object to provide a method and an apparatus for transmitting/receiving information in a communication system.

The present disclosure provides an effective signaling method and apparatus for supporting multiuser superposition transmission in downlink of a cellular system.

The present disclosure provides a structure of signaling and control information for supporting multiuser superposition transmission.

The present disclosure provides an additional downlink control information format for supporting signals to a plurality of UEs through the same resources.

The present disclosure provides a method and an apparatus for supporting reference signals for multiuser superposition transmission in a cellular system.

The present disclosure provides a method and an apparatus for supporting multiuser superposition transmission for multiple users who use different precoders and transmission modes.

In accordance with an aspect of the present disclosure, a method of supporting multiuser superposition transmission is provided. The method includes: transmitting a signaling message including an indication of multiuser superposition transmission to a first UE among multiuser superposition transmission-scheduled UEs; transmitting first Downlink Control Information (DCI) containing transmission information for the first UE and second DCI containing transmission information for at least one second UE, which is not the first UE, among the multiuser superposition transmission-scheduled UEs to the first UE; and transmitting a first downlink signal containing data for the first UE and a second downlink signal containing data for the second UE in a superposed manner on same resources.

In accordance with another aspect of the present disclosure, a method of supporting multiuser superposition transmission by a near UE is provided. The method includes: receiving a signaling message including an indication of multiuser superposition transmission; receiving first Downlink Control Information (DCI) containing transmission information for the near UE and second DCI containing transmission information for at least one far UE among the multiuser superposition transmission-scheduled UEs; and receiving a downlink superposition signal and removing interference by a downlink signal containing data for the second UE from the received downlink superposition signal based on transmission information included in the second DCI.

In accordance with another aspect of the present disclosure, an apparatus within a BS supporting multiuser superposition transmission is provided. The apparatus includes: a controller that generates a signaling message including an indication of multiuser supposition transmission to a first UE among multiuser superposition transmission-scheduled UEs and generates first Downlink Control Information (DCI) containing transmission information for the first UE and second DCI containing transmission information for at least one second UE, which is not the first UE, among the multiuser superposition transmission-scheduled UEs; and a transmitter that transmits the signaling message to the first UE, transmits the first DCI and the second DCI to the first UE, and transmits a first downlink signal containing data for the first UE and a second downlink signal containing data for the second UE in a superposed manner on same resources.

In accordance with another aspect of the present disclosure, an apparatus of a near UE supporting multiuser superposition transmission is provided. The apparatus includes: a receiver that receives a signaling message including an indication of multiuser supposition transmission, receives first Downlink Control Information (DCI) containing transmission information for the near UE and second DCI containing transmission information for at least one far UE among the multiuser superposition transmission-scheduled UEs, and receives a downlink superposition signal; and a controller that removes interference by a downlink signal containing data for the second UE from the received downlink superposition signal based on transmission information included in the second DCI.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

The above and other aspects, features, and advantages, according to specific exemplary embodiments of the present disclosure, will be more apparent from the following detailed description taken in conjunction with the accompanying drawings, in which:

FIG. 3 illustrates a comparison between system performances of OMA and NOMA in terms of the transmission rate at a cell center and edge;

FIG. 4 illustrates DCI formats used for downlink scheduling;

It should be noted that similar reference numerals are used to indicate identical or similar elements, features, and structures through the above figures.

DETAILED DESCRIPTION

Figure 1A:
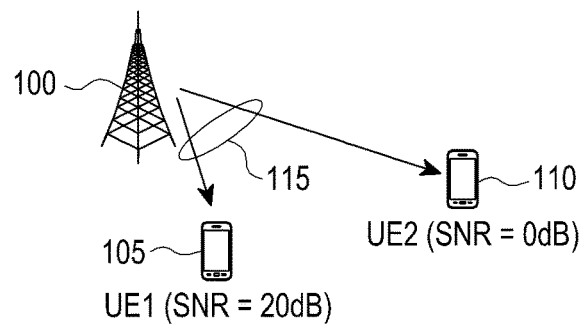
FIGS. 1A, 1B, and 1C illustrate communication between a BS and a UE in a NOMA system and an OMA system.

FIGS. 1A through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Hereinafter, embodiments of the present disclosure will be described in detail with reference to the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Here, the term "~unit" as used in embodiments of the present disclosure means a software or hardware component, such as a field-programmable gate array (FPGA) or an application specific integrated circuit (ASIC), and the "~unit" performs any functions. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, subroutines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card. Although the detailed description of embodiments of the present disclosure will be made mainly based on a particular wireless communication system, the subject matter of the present specification can be applied to other communication systems and services having the similar technical background without departing from the scope of the present specification, and the application can be determined by those skilled in the art.

At least some of the embodiments proposed by the present disclosure can be applied to various communication systems, such as a Long Term Evolution (LTE) mobile communication system, a LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system of 3rd Generation Project Partnership 2 (3GPP2), a Wideband Code Division Multiple Access (WCDMA) mobile communication system 3GPP2, a Code Division Multiple Access (CDMA) mobile communication system of 3GPP2, an Institute of an Electrical and Electronics Engineer (EEEE) 802.16m communication system, an Evolved Packet System (EPS), a Mobile Internet Protocol (Mobile IP) system and the like.

Figure 1B:
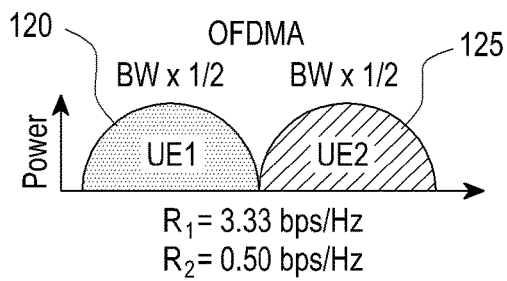
Figure 1C:
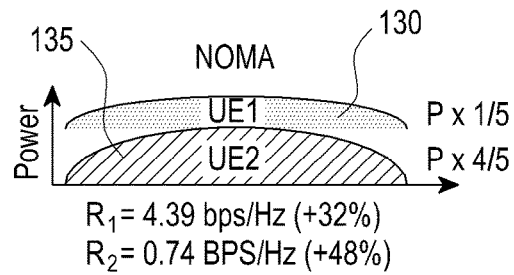

FIGS. 1A, 1B, and 1C illustrate communication between a BS and a UE in a NOMA system and an OMA system.

Referring to FIG. 1A, a BS 100 determines NOMA transmission to two UEs 105 and 110 through scheduling and allocates the same time/frequency resources 115 to the UEs 105 and 110. The BS 100 determines UE#1 105, which is relatively near the BS 100, as a near UE and allocates a power level 120 of relatively low power, for example, ⅕ of available power of the BS 100, to a signal for the UE#1 105. Then, UE#2 110, which is relatively far from the BS 100, is determined as a far UE, and UE#2 110 receives a power level 125 of relatively high power, for example, ⅘ of available power of the BS 100. The BS 100 superposes a downlink signal containing data for UE#1 105 and a downlink signal containing data for UE#2 110 and transmits the superposed downlink signals to the UEs 105 and 110 through the same resources 115.

UE#1 105 receives the superposed signal. Since UE#1 105 is located near the BS 100, attenuation of the superposed signal is not greater than a threshold. The power level of the signal for UE#2 110 is high, so that the signal for UE#2 110 can occupy a large portion in the superposed signal received by UE#1 105. Accordingly, a Signal to Interference and Noise Ratio (SINR) of the superposed signal received by UE#1 105 is relatively larger than that of UE#2 110. In an example of FIG. 1A, the SINR of UE#1 105 is 20 dB.

In contrast, since the power level of the signal for UE#1 105 is low and UE#2 110 is spaced apart from the BS 100, the signal for UE#1 105 is mostly attenuated and arrives at UE#2 110. Accordingly, the signal for UE#1 105 can include power at a similar level to that of noise of the superposed signal received by UE#2 110. Therefore, the signal for UE#2 110 occupies most signal components of the superposed signal received by UE#2 110. Further, since the signal for UE#2 110 is attenuated while arriving at UE#2 110, the SINR of the signal received by UE#2 110 is relatively small. In an example of FIG. 1A, the SINR of UE#2 110 is 0 dB.

In the illustrated example, the superposed signal received by UE#1 105 includes the signal for UE#1 105 and the signal for UE#2 110, and transmission power of the signal for UE#2 110 is very larger than that of the signal for UE#1 105, so that UE#1 105 can distinguish between the signal for UE#2 110 and the signal for UE#1 105. Accordingly, UE#1 105 can remove the signal (that is, interference) of UE#2 110 from the superposed signal and detect a desired signal. Meanwhile, since UE#2 110 handles the signal for UE#1 105 as noise in the superposed signal received by UE#2 110 and handles only the signal for UE#2 110 as the signal component, UE#2 110 can easily detect a desired signal without an operation for removing interference of the signal for UE#1 105.

FIG. 1B illustrates system performance in the OFDMA scheme. That is, FIG. 1B illustrates downlink transmission performance for UE#1 105 and UE#2 110 when ½ bandwidths 120 and 125 of available bandwidths and all available power are allocated to UE#2 110 through OFDMA. In OFDMA communication, a downlink transmission rate (R1) of UE#1 105 is 3.33 bps/Hz, and a downlink transmission rate (R2) of UE#2 110 is 0.50 bps/Hz. Accordingly, in OFDMA, a sum transmission rate of the whole system is 3.83 bps/Hz.

FIG. 1C illustrates system performance in the NOMA scheme. That is, all available bandwidths are allocated to UE#1 105 and UE#2 110, and ⅕ power 130 and ⅘ power 135 of the available power are allocated to UE#1 105 and UE#2 110, respectively. In this case, a downlink transmission rate (R1) of UE#1 105 is 4.39 bps/Hz, and a downlink transmission rate (R2) of UE#2 110 is 0.74 bps/Hz. Accordingly, in NOMA, a sum transmission rate of the whole system is 5.11 bps/Hz. As described above, it is noted that the whole system performance of NOMA is better than the whole system performance of OFDMA.

In the NOMA system, a performance gain of the whole system becomes larger as a difference between SINRs of downlink superposed signals received by UEs that share resources is larger. Accordingly, in the NOMA system, the BS selects UEs having a large difference between SINRs of received signals through MUST signaling and allocated the same resources to the selected UEs. Meanwhile, although it is assumed that two UEs share resources in FIG. 1A, the number of UEs that share the same resources can be two or more.

Figure 2A:
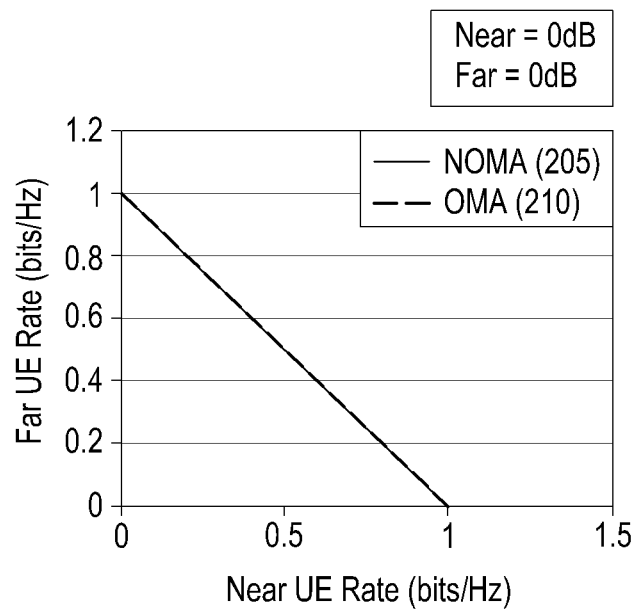
FIGS. 2A and 2B illustrate a comparison between system performances according to SINRs of MUST UEs.
Figure 2B:
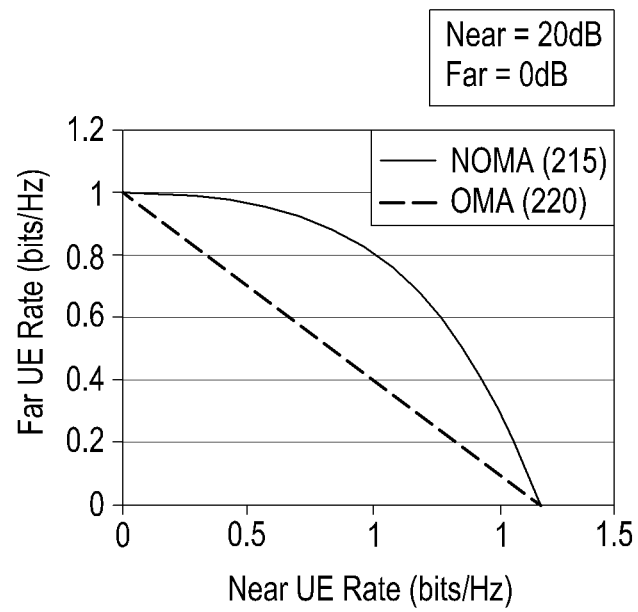

FIGS. 2A and 2B illustrate a comparison between system performances according to SINRs of MUST UEs.

In FIG. 2A, SINRs of a near UE and a far UE are 0 dB and thus there is no difference therebetween. In NOMA 205 and OMA 210, a transmission speed of the far UE with respect to a transmission speed of the near UE is the same. In FIG. 2B, the SINR of the far UE is 0 dB and the SINR of the near UE is 20 dB. Accordingly, it is noted that the transmission rate of the far UE with respect to the transmission rate of the near UE in NOMA 215 is better than that in OMA 220.

FIG. 3 illustrates a comparison between system performances of OMA and NOMA in terms of a transmission speed at a cell center and edge.

Referring to FIG. 3, in a Single Input Multiple Output (SIMO) environment in which the BS uses a single antenna, a NOMA edge transmission rate increases by about 65% compared to OMA as indicated by reference numeral 305. Further, in a single user MIMO environment, a NOMA edge transmission speed increases by 67% to 80% compared to OMA as indicated by reference numeral 310.

In 3GPP LTE Release 13, the discussion for applying a MUST operation through NOMA in the LTE system is being progressed. In the LTE system, UEs can use different Transmission Modes (TMs) and different precoding schemes. When UEs using different precoders are paired for MUST, it is noted that MUST performance increases compared to pairing only UEs using the same precoder. Similarly, when UEs using Closed Loop (CL) single user MIMO and UEs using Open Loop (OL) single user MIMO coexist, if UEs using different transmission modes are paired, MUST performance increases compared to pairing UEs using the same transmission mode. Accordingly, in the LTE system, UEs having different transmission modes and/or different precoding information can share resources through the MUST.

In the LTE system, the BS provides control information required for demodulating data by the UE based on a Downlink control Information (DCI) format on a Physical Downlink Control Channel (PDCCH). Since the UE receives a desired DCI format through blind detection, efficiently providing additional information needed for the MUST operation while not significantly increasing reception complexity of the UE is required. Particularly, since the PDCCH provides UE-specific signaling, the near UE is required to identify MUST-related information of the far UE in order to detect a signal of the far UE.

Accordingly, at least some of the following embodiments describe methods by which the BS transfers additional information (that is, MUST-related information) required for removing the signal of the far UE to the near UE based on a DCI format defined in the LTE standard. Further, according to at least some of the following embodiments, MUST-related information required for removing the signal of the far UE can be transferred to the near UE based on a Radio Resource control (RRC) message defined in the LTE standard.

Information required for the MUST operation, that is, MUST-related information can include at least some of the following elements.

NOMA indicator (or indication) or MUST indicator (or indication): indicates that corresponding transmission is MUST MUST Power Allocation (PA) information: indicates a power ratio corresponding to a ratio of transmission power allocated to the signal of each UE in MUST. The PA information can be indicated by a power offset that indicates a difference from the existing transmission power. The PA information is needed for not only the near UE but also the far UE. However, when the PA is fixed, the MUST indication can replace the PA information.

SIC level: indicates the number of far UE signals (that is, the number of far UEs allocated to MUST) to perform an SIC operation by the near UE for particular resources. However, when the number of UEs to which MUST is applied is set as 2, a value of the SIC level is fixed to 1, so that the SIC level may not be separately provided and the MUST indication or the PA can replace the SIC level. In MUST on resources, which are not the same, a resource-specific SIC level should be provided.

Information on the far UE required for the SIC operation of the near UE in MUST can include at least one piece of the following information.

information on resource assignment allocated to the far UE: indicates a Modulation and Coding Scheme (MCS) for the far UE signal The resource assignment information can be generated according to a resource assignment scheme of the existing LTE system or generated according to a resource assignment scheme for MUST.

MCS information of the far UE: required for performing SIC (CW-SIC) at a CodeWord (CW) level. The MCS information can be configured equally to MCS information of the existing LTE system or generated according to an MCS allocation scheme for MUST.

precoding information of the far UE: indicate a Precoding Matric Index (PMI) used for downlink transmission to the far UE. A number of bits can be determined according to a number of antenna ports which can be used.

Transmission Mode (TM) information of the far UE: indicates at least one of the transmission modes determined in the LTE system. The transmission mode of the near UE can be indicated through an RRC message.

In order to control a multi-antenna transmission scheme according to a wireless environment, the LTE system supports various transmission modes defined according to a number of antenna ports used in the LTE system, a number of layers, a type of reference signal, and a precoding type. The type of reference signal can be a Cell-specific Reference Signal (CRS) or a Demodulation Reference Signal (DM-RS), and the DM-RS can be provided as a UE-specific reference signal in one transmission modes 7 to 10 among 10 transmission modes proposed in the LTE system. Different transmission modes have different DCI format types and uplink feedbacks required. The uplink feedbacks can include a Channel Quality indication (CQI), a Rank Indicator (RI), and a Precoding Matrix Index (PMI).

Table 1 below describes downlink transmission modes which can be used in the LTE system.

TABLE 1

| TM | Purpose | DCI format | Uplink feedback required | | |
|---|---|---|---|---|---|
| | | | CQI | RI | PMI |
| 1 | Single antenna transmission | 1A,1 | V | | |
| 2 | Open loop transmit diversity | 1A,1 | V | | |
| 3 | Open loop spatial multiplexing | 1A,2A | V | V | |
| 4 | Closed loop spatial multiplexing | 1A,2 | V | V | V |
| 5 | Multiple user MIMO | 1A,1D | V | | V |
| 6 | Closed loop transmit diversity | 1A,1B | V | | V |
| 7 | Beamforming | 1A,1 | V | | |
| 8 | Dual layer beamforming | 1A,2B | V | Configurable | |
| 9 | Eight layer spatial multiplexing | 1A,2C | V | Configurable | |
| 10 | Eight layer spatial multiplexing | 1A,2D | V | Configurable | |

Through MUST scheduling, the BS can pair UEs having the same transmission mode or pair UEs having different transmission modes. Further, for MUST, the BS can pair UEs having the same PMI or pair UEs having different PMIs.

A transmission mode allocated to each UE can be transmitted to the corresponding UE through an RRC message. Further, the PMI is indicated to the corresponding UE through a particular DCI format along with other control information. The DCI format includes control information elements determined through downlink scheduling and defines a transmission scheme and transmission parameters used for downlink signal transmission.

FIG. 4 illustrates DCI formats used for downlink scheduling.

Referring to FIG. 4, DCI formats 1, 1A, 1B, 1C, 1D, 2, 2A, 2B, and 2C are defined as DCI formats for downlink scheduling, pieces of information included in different DCI formats are different from each other, and a DCI format to be used can be determined according to a transmission mode set on the UE. Control information elements which can be included in the DCI format are as follows.

Resource information can be included in all DCI formats and indicates a carrier indicator and a resource block assignment type. According to an embodiment, DCI formats for UEs allocated to MUST can include resource information indicating the same resource area.

A Hybrid Automatic Repeat request (HARQ) process number identifies the HARQ process used for downlink transmission.

MCS, Redundancy Version (RV), and New Data indicator (NDI) can be included for each transport block. DCI format 1C can include only MCS without RV and NDI. DCI formats 2/2A/2B/2C can include MCS, RV, and NDI for two transport blocks.

Multi antenna information can include at least one of PMI confirmation information, precoding information, transport block swap flag, power offset, Demodulation Reference Signal (DM-RS) scrambling information, and number of layers. The PMI confirmation information is included in DCI format 1B, the precoding information is included in DCI formats 1B/1D/2/2A, the transport block swap flag is included in DCI formats 2/2A, and the power offset is included in DCI format 1D.

The remaining DCI formats except for DCI format 1C can include a downlink assignment index and Physical Uplink control Channel (PUCCH) power control information, and DCI format 1A can further include a flag for DCI format 0/1A.

The following embodiment defines a new DCI format to transfer information required for the MUST operation.

More specifically, the BS provides one new DCI format to be transferred to the near UE for the MUST operation. Meanwhile, instead of providing information on a transmission power offset according to MUST to the far UE, the BS fixes a power ratio between the far UE and the near UE by controlling the MCS and thus may not add the DCI format for the far UE.

Figures 5, 6:
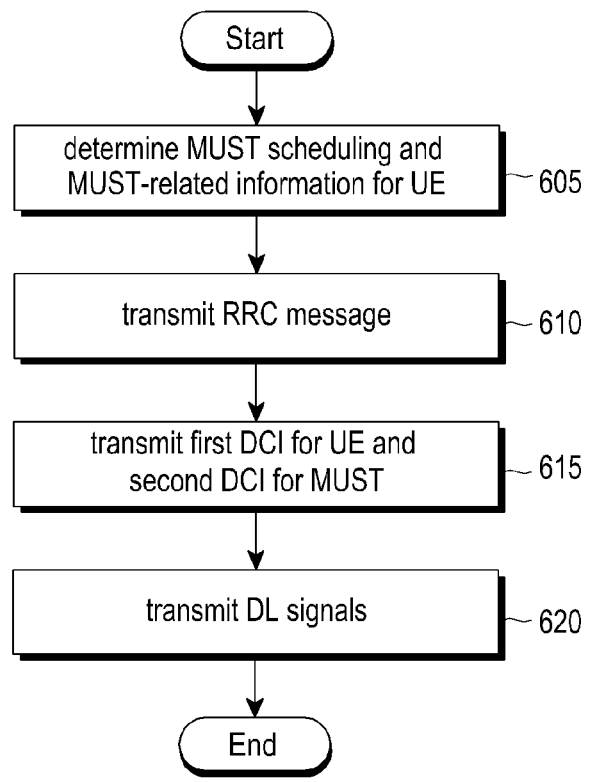
FIG. 5 illustrates a DCI format provided to a near UE for a MUST operation according to an embodiment of the present disclosure.
FIG. 6 is a flowchart illustrating a transmission operation of downlink control information according to an embodiment of the present disclosure.

FIG. 5 illustrates a DCI format (hereinafter, referred to as a MUST DCI format) provided to the near UE for the MUST operation according to an embodiment of the present disclosure.

Referring to FIG. 5, a MUST DCI format 500 indicates at least one of an MCS 505 for the far UE, a transmission mode 510 for the far UE, and precoding information 515 for the far UE.

The MUST DCI format 500 itself indicates the MUST to the near UE, so that a MUST indication is not included.

When MUST transmission is limited to two UEs, power assignment information and the SIC level can be omitted. Further, since the MUST operation is performed on the same resources, a resource area allocated to the far UE is not needed to be known to the near UE. MUST for another resource area can be indicated by a separate MUST DCI format.

A transmission mode of the near UE is acquired through an RRC message.

The BS can restrictively select the modulation order of the near UE and the far UE, and omit or shorten the MCS information 505 of the far UE in the MUST DCI format 500. For example, when the near UE is configured with the modulation order equal to or lower than 16-ary Quadrature Amplitude Modulation (16QAM), the BS can always allocate Quadrature Phase Shift Keying (QPSK) to the far UE. In another example, when the near UE is configured with 64QAM, the far UE can be configured with 16QAM or QPSK. In this case, the MCS indication 505 of the MUST DCI format 500 can comprises 1 bit, and a value of 0 can indicate QPSK and a value of 1 can indicate 16QAM.

FIG. 6 is a flowchart illustrating a transmission operation of downlink control information according to an embodiment of the present disclosure.

Referring to FIG. 6, in process 605, the BS pairs UEs to be allocated to MUST by performing MUST scheduling for UEs within a cell, and determines MUST-related information for the paired near and far UEs. The MUST-related information can include at least one of CQI, PMI, transmission mode information, and MCS information, and the information can be received from UEs or determined by the BS based on information received from UEs. Through the MUST scheduling, the BS selects near and far UEs to perform the MUST transmission from UEs having a MUST function and allocates resources to the selected UEs. According to an embodiment, the BS can select a pair of UEs including UEs having a difference between SINRs thereof that is larger than or equal to a predetermined value based on CQI. According to another embodiment, the BS can consider at least one of precoding information, transmission mode, and MCS of each UE to determine the pair of UEs for MUST. According to another embodiment, the BS can select a pair of UEs that use the same transmission mode or different transmission modes.

In process 610, the BS transmits an RRC message containing signaling information for the near UE. The RRC message can include transmission mode information allocated to the near UE. Here, although the RRC message is transmitted in process 610 after the MUST scheduling in process 605, the RRC message can be transmitted regardless of the MUST scheduling 605, that is, before the MUST scheduling 605. Further, the RRC message can further include a MUST indication indicating that the MUST is applied to the near UE.

In process 615, the BS generates and transmits a first DCI containing control information for the near UE and a second DCI for a MUST operation of the near UE. The second DCI has a MUST DCI format including MUST-related information for the far UE. According to an embodiment, the second DCI can include at least one of MCS, transmission mode information, and precoding information for the far UE as illustrated in FIG. 5, and may not include other control information elements illustrated in FIG. 4. Accordingly, the second DCI can have a relatively small size compared to the general DCI format. Although not illustrated, a separate DCI containing control information for the far UE can be transmitted to the near UE from the BS.

In process 620, the BS transmits a downlink signal containing data for the near UE generated according to the first DCI and a downlink signal for the far UE on the same resources in a superposed manner.

Figure 7:
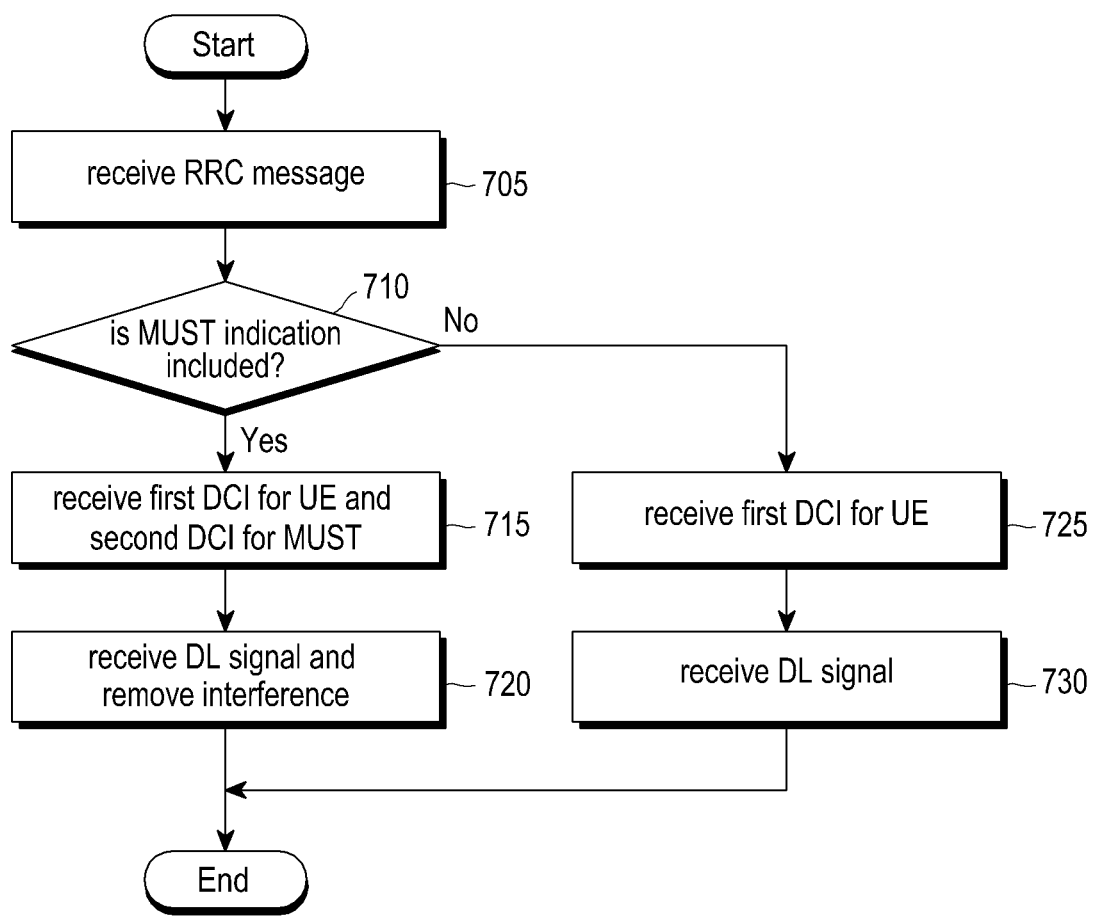
FIG. 7 is a flowchart illustrating a reception operation of downlink control information according to an embodiment of the present disclosure.

FIG. 7 is a flowchart illustrating a reception operation of downlink control information according to an embodiment of the present disclosure. Here, a reception operation by the near UE configured that can receive the MUST transmission is described. As described above, the far UE does not need to remove a signal for the near UE from the received superposed signal, so that the downlink receive operation by the far UE can be the same as the existing operation (that is non-MUST).

Referring to FIG. 7, in process 705, the UE receives the RRC message from the BS. The RRC message can include signaling information required for communication with the BS and, particularly, include at least one of transmission mode information allocated to the UE and the MUST indication. When the MUST is instructed, the RRC message can further include resource information indicating a time/frequency resource location at which control information required for MUST is transmitted. For example, the resource information can include at least one of a subframe offset and a subframe duration.

In process 710, the UE determines whether the MUST indication is included in the RRC message. According to another embodiment, the UE can determine whether the MUST indication included in the RRC message is set as a value indicating the MUST operation. When it is identified to instruct the MUST based on the RRC message, the UE proceeds to process 715.

In process 715, the UE receives the first DCI containing control information required for receiving a data channel allocated to the UE and the second DCI containing MUST-related information of the far UE required for the MUST operation based on information included in the RRC message. According to an embodiment, the UE can receive the first and second DCIs during Y subframes after X subframes from reception of the RRC message according to the offset (X) and the duration (Y) included in the RRC message. According to an embodiment, the UE can continuously receive the first and second DCIs until a separate instruction (for example, through the RRC message) is received. According to another embodiment, when the RRC message instructs the MUST, the UE can receive the first and second DCIs during predetermine Y subframes after predetermined X subframes. At least one of X and Y can be indicated or reconstructed by the RRC message.

In process 720, the UE receives a downlink signal in a resource area indicated by the first DCI. Since the UE is configured with MUST, the downlink signal is a superposed signal including the signal of the far UE. Accordingly, the UE removes the signal (that is, acting as interference) of the far UE from the downlink signal by executing an SIC algorithm for the downlink signal based on information included in the second DCI. The SIC algorithm can be performed at a codeword level or a modulated symbol level. When the SIC algorithm at the codeword level is used, an SIC receiver within the UE can generate soft output data by estimating a channel and removing interference for de-interleaved and de-modulated codewords. When the SIC algorithm at the modulated symbol level is used, the SIC receiver can generate hard output data by estimating a channel and removing interference for modulated symbols.

Meanwhile, when the MUST is not instructed in process 710, the UE receives the first DCI in a predetermined subframe in process 725 and receives and decodes a downlink signal based on information included in the first DCI in process 730.

According to the following embodiment, the BS may not insert information on the far UE into the DCI format for the near UE, but can inform the near UE of an identifier of the far UE and allow the near UE to directly acquire the DCI of the far UE.

Figures 8, 9:
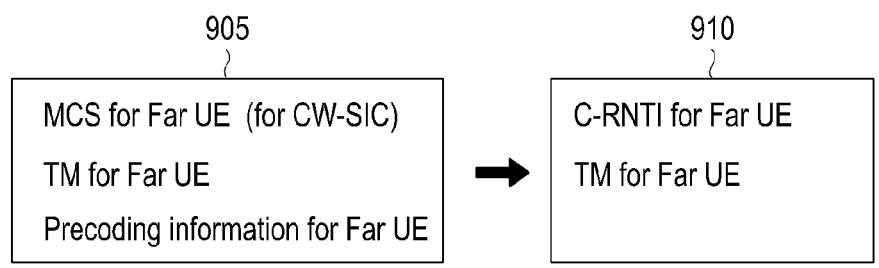
FIG. 8 illustrates a DCI format including an identifier of the far UE according to an embodiment of the present disclosure.
FIG. 9 illustrates an operation of transmitting MUST-related information according to an embodiment of the present disclosure.

FIG. 8 illustrates a DCI format including an identifier of the far UE according to an embodiment of the present disclosure.

Referring to FIG. 8, a DCI format 800 can indicate at least one of an MCS 805 for the far UE, a transmission mode 810 for the far UE, and precoding information 815 for the far UE, and the BS can selectively insert a Cell Radio Network Temporary Identifier (C-RNTI) corresponding to the identifier of the far UE required for receiving the DCI format of the far UE into the DCI format 800. According to a modified embodiment, MUST-related information for the far UE, that is, MCS, transmission mode, precoding information and/or C-RNTI can be transmitted while being inserted into the DCI format for the near UE.

The near UE acquires the identifier of the far UE from the MUST DCI format 800 and receives control information of the far UE through the DCI format of the far UE based on the identifier of the far UE. Then, the near UE can remove a signal of the far UE from the received superposed signal based on control information of the far UE.

FIG. 9 illustrates an operation of transmitting MUST-related information according to an embodiment of the present disclosure.

Referring to FIG. 9, the MUST-related information for the far UE can be transmitted through a MUST DCI format 905, and additional MUST-related information 910 can be transmitted to the near UE through the MUST DCI format 905.

The additional MUST-related information 910 can include a C-RNTI and/or a transmission mode of the far UE. The near UE can receive the DCI format for the far UE by performing blind detection for control channel resources based on the C-RNTI of the far UE and acquire information required for removing the signal of the far UE from the superposed signal. At this time, the MUST DCI format 905 can include C-RNTI(s) of one or more far UEs. According to an embodiment, the UE acquires control information (that is, DCI) of other UE(s) by decoding the control channel resources based on the C-RNTI(s) and determines whether at least one far UE that shares the same resources exists by analyzing the control information. When at least one far UE that shares the same resources exists, the UE can perform an SIC based on the control information of the far UE.

According to another embodiment, an RRC message for the near UE can include a C-RNTI corresponding to an identifier required for decoding a control channel of the far UE. The BS transmits the RRC message including the C-RNTI of the far UE to the near UE before X subframes from transmission of DCIs. The near UE can detect the DCI format of the far UE based on the C-RNTI of the far UE and acquire information required for the SIC operation.

According to another embodiment, the RRC message for the near UE can include MUST-related information of the far UE. The BS can insert MCS information, precoding information, and transmission mode information for the far UE into the RRC message, and the near UE can perform the SIC operation based on the information acquired through the RRC message.

As described above, the BS can provide the MUST to the near UE and the far UE that use different transmission modes and different precoders. Among the transmission modes which can be configured for the UEs, a transmission mode 7 to a transmission mode 10 can support the DM-RS to transmit a signal optimized for the UE. The BS transmits the DM-RS for the UE to which a particular transmission mode is allocated, and the UE estimates a channel based on the received DM-RS.

When both the near UE and the far UE use a transmission mode using the DM-RS (for example, one of transmission modes 7 to 10) and use different precoders, channel estimation using the DM-RS can have a problem. Transmission modes 7 to 10 correspond to schemes for generating a beamforming vector/matrix based on a non-codebook, and can use a precoder suitable for the channel of the UE for downlink transmission, thereby having more excellent performance compared to other transmission modes. When transmission modes 7 to 10 are used, the BS applies a precoder optimized for each UE to downlink transmission, so that the UEs are highly likely to use different precoders. Accordingly, in MUST scheduling, the near UE and the far UE frequently use different precoders.

When the transmission modes using the DM-RS are allocated to both the near UE and the far UE in MUST transmission, the BS transmits reference signals for the near UE and the far UE on equally located Resource Elements (REs) in a superposed manner and, accordingly, each UE cannot accurately estimate its own channel. Particularly, in order to smoothly perform the SIC by the near UE, it is important for the near UE to accurately estimate the channel for the far UE.

As described above, when the transmission modes using the beamforming vector/precoder based on the non-codebook are allocated to a UE, the BS estimates the channel of the UE through PMI feedback of the UE or estimates the channel of the UE by using channel reciprocity based on an uplink sounding reference signal. The BS determines a precoder suitable for the estimated channel of the UE and applies the precoder to data to be transmitted to each UE.

Figure 10A:
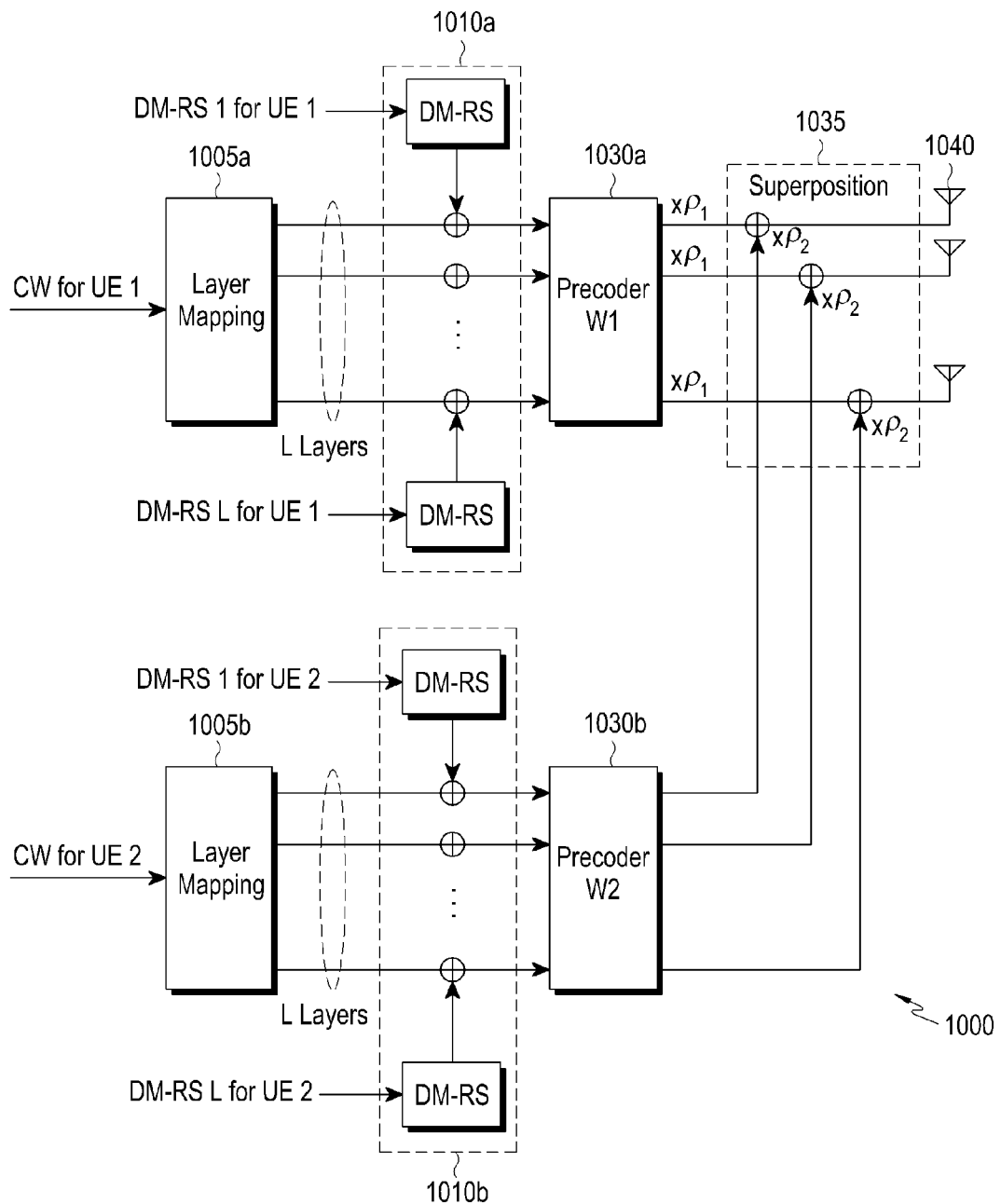
FIG. 10A illustrates a structure of a transmitter of the BS according to an embodiment of the present disclosure.

FIG. 10A illustrates a structure of a transmitter of the BS according to an embodiment of the present disclosure.

Referring to FIG. 10A, a transmitter 1000 of the BS for supporting multiuser superposition for a plurality of users includes layer mapping units 1005a and 1005b, DM-RS mapping units 1010a and 1010b, precoders 1030a and 1030b, and a superposition transmitter 1035. Here, although a structure in which user data for two UEs (that is, UE 1 and UE 2) is transmitted is described, a structure of the shown transmitter 1000 can be easily expanded to two or more UEs.

Codewords for UE 1 are input into the layer mapping unit 1005a, and the layer mapping unit 1005a divides the codewords into L layer signals corresponding to the L layers and outputs the divided layer signals. Each layer signal is combined with DM-RS 1 for UE 1 by the DM-RS mapping unit 1010a and then input into the precoder 1030a. The precoder 1030a precodes the DM-RS mapped layer signals by using precoding matrix W1 predetermined for UE 1.

Codewords for UE 2 are input into the layer mapping unit 1005b, and the layer mapping unit 1005b divides the codewords into L layer signals corresponding to the L layers and outputs the divided layer signals. Each layer signal is combined with DM-RS 2 for UE 2 by the DM-RS mapping unit 1010b and then input into the precoder 1030b. The precoder 1030b precodes the DM-RS mapped layer signals by using precoding matrix W2 predetermined for UE 2.

Precoding signals for UE 1 and UE 2 are summed according to each layer by the superposition transmitter 1035 and then transmitted by the plurality of transmission antennas 1040.

Figure 10B:
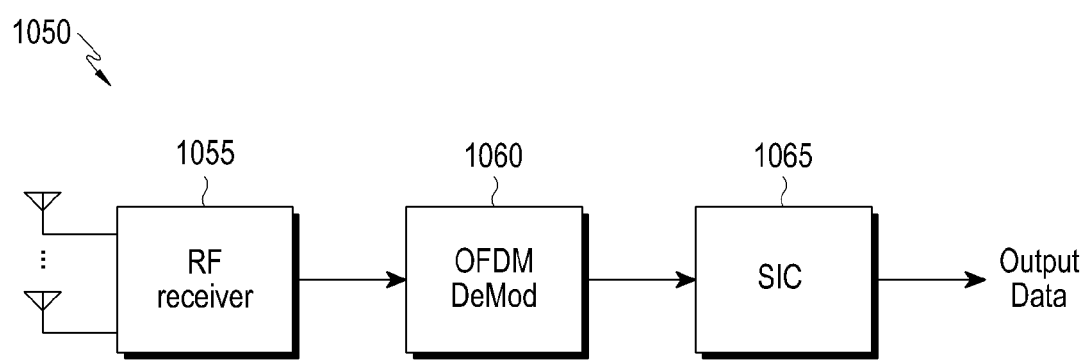
FIG. 10B illustrates a structure of a receiver of the UE according to an embodiment of the present disclosure.

FIG. 10B illustrates a structure of a receiver of the UE according to an embodiment of the present disclosure.

Referring to FIG. 10B, a receiver 1050 of the UE includes a Radio Frequency (RF) receiver 1055, an OFDM demodulator 1060, and an SIC receiver 1065. The RF receiver 1055 receives a downlink signal by using one or a plurality of reception antennas 1055. When multiuser superposition is applied, the downlink signal becomes a superposed signal. The OFDM demodulator 1065 performs Fast Fourier Transform (FFT) on the downlink signal and removes Cyclic Prefix (CP) added to each OFDM symbol. The demodulated signal output from the OFDM demodulator 1065 is input into the SIC receiver 1065 through dispreading (not shown).

The SIC receiver 1065 removes interference by the signal of the far UE by performing an SIC algorithm on the demodulated signal and detects and outputs a desired signal (that is, a signal for the UE). The desired signal can be soft or hard output data.

In order to detect the desired signal, the UE requires precoding information applied to transmission of the downlink signal, for example, a precoding matrix index. However, when transmission modes based on the non-codebook, for example, transmission modes 7 to 10 are applied to the UE, the BS can allow the UE to indirectly acquire precoding information through the DM-RS instead of directly transferring the precoding information to the UE.

The DM-RS corresponds to a UE-specific reference signal and is generated for the UE that receives the DM-RS. The UE that receives the DM-RS uses the DM-RS to estimate a downlink channel. The BS transmits the DM-RS after applying, to the DM-RS, the same precoder (that is, precoding matrix) as that applied when the data signal is transmitted. The UE can acquire an effective channel, to which precoding information is applied, through estimation of the DM-RS and detect data from a received signal based on the acquired effective channel.

When the multiuser superposition is applied, signals for two or more UEs can be transmitted through the same layer. At this time, when two UEs have different precoders, it is required to transmit the different DM-RSs to which two different precoders are applied.

Codewords to be transmitted to each UE are generated through channel coding and modulation. The BS performs layer mapping on the codewords according to the number of layers to be transmitted as indicated by reference numerals 1005a and 1005b. The data signal to be transmitted according to each layer is mapped to a plurality of Resource Blocks (RBs) within on subframe and the DM-RS to be transmitted to the UE is mapped to predetermined RBs within the subframe.

In such a process, the DM-RS mapping units 1010a and 1010b map the DM-RS to particular RBs according to the transmission mode of each UE, to which MUST is applied, and the number of layers in the following embodiments.

According to an embodiment, when one of the UEs, to which MUST is applied, is configured with a transmission mode 7 and another UE is configured with one of transmission modes 8 to 10 having one to four layers, the BS can transmit the DM-RS for the near UE and the DM-RS for the far UE alternately within one subframe. For example, during the application of MUST, the UE transmits the DM-RS, to which the precoder for the far UE is applied, in a first slot of one subframe having two slots and transmits the DM-RS, to which the precoder for the near UE is applied, in a second slot. In contrast, the DM-RS, to which the precoder for the near UE is applied, can be transmitted in the first slot, and the DM-RS, to which the precoder for the far UE is applied, can be transmitted in the second slot.

According to an embodiment, when one of the UEs, to which MUST is applied, is configured with a transmission mode 7 and another UE is configured with one of transmission modes 8 to 10 having one to four layers, the BS can transmit the DM-RS for the near UE and the DM-RS for the far UE alternately in a frequency domain. Such a scheme can be applied when the precoder applied to one UE is the same during a predetermined number of RBs. The BS transmits the DM-RS of the far UE in a first RB among odd-numbered RBs, transmits the DM-RS of the near UE in a second RB, and transmits again the DM-RS of the far UE in a third RB. Further, the BS transmits the DM-RS of the near UE in a first RB among even-numbered RBs, transmits the DM-RS of the far UE in a second RB, and transmits again the DM-RS of the near UE in a third RB. Alternatively, an operation opposite thereto can be performed.

According to an embodiment, when the UEs, to which MUST is applied, are configured with a transmission mode 9 or 10 having 5 to 8 layers, the BS can transmit the DM-RS for the near UE and the DM-RS for the far UE alternatively in the frequency domain. Such a scheme can be applied when the precoder applied to one UE is the same during a predetermined number of RBs. The BS transmits the DM-RS of the far UE in a first RB among odd-numbered RBs, transmits the DM-RS of the near UE in a second RB, and transmits again the DM-RS of the far UE in a third RB. Further, the BS transmits the DM-RS of the near UE in a first RB among even-numbered RBs, transmits the DM-RS of the far UE in a second RB, and transmits again the DM-RS of the near UE in a third RB. Alternatively, an operation opposite thereto can be performed.

Figure 11:
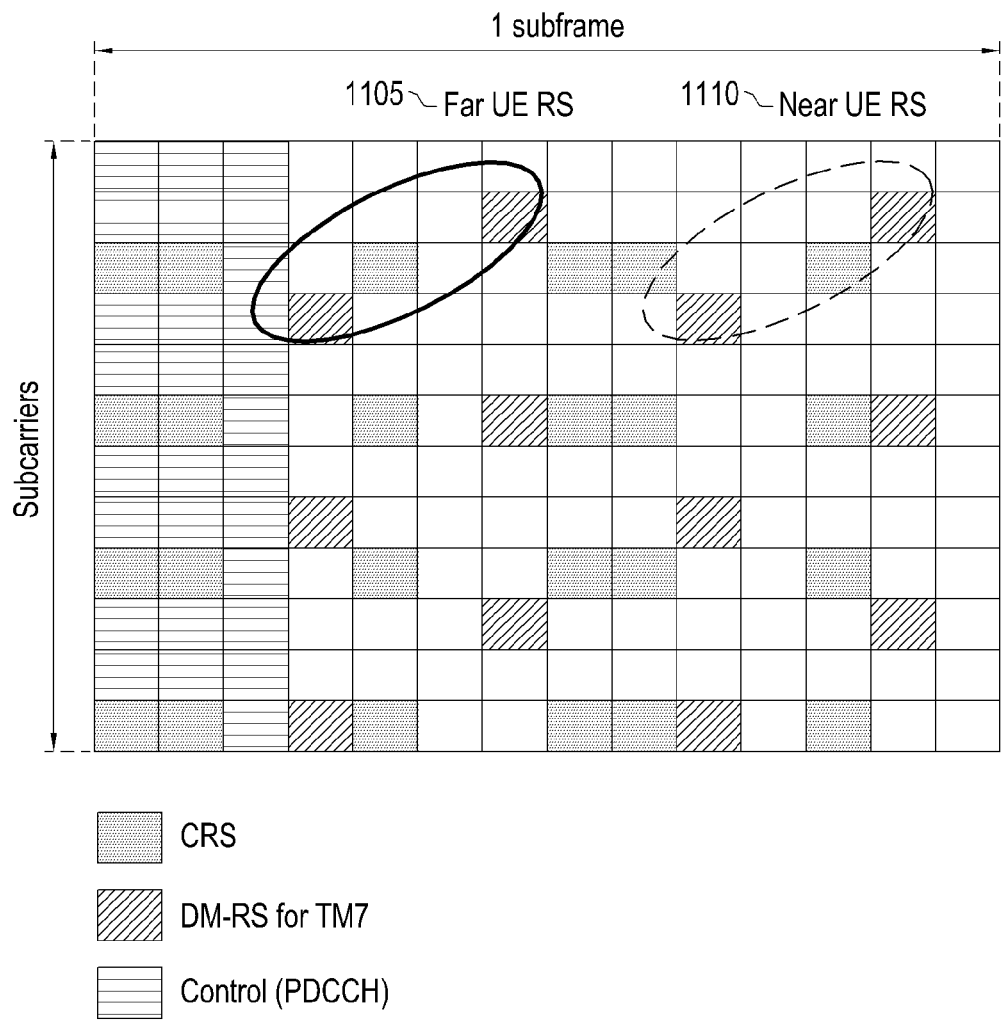
FIGS. 11 and 12 illustrate transmission of UE-specific reference signals for supporting multiuser superposition transmission of UEs that use a transmission mode 7 and a normal CP according to embodiments of the present disclosure.
Figure 12:
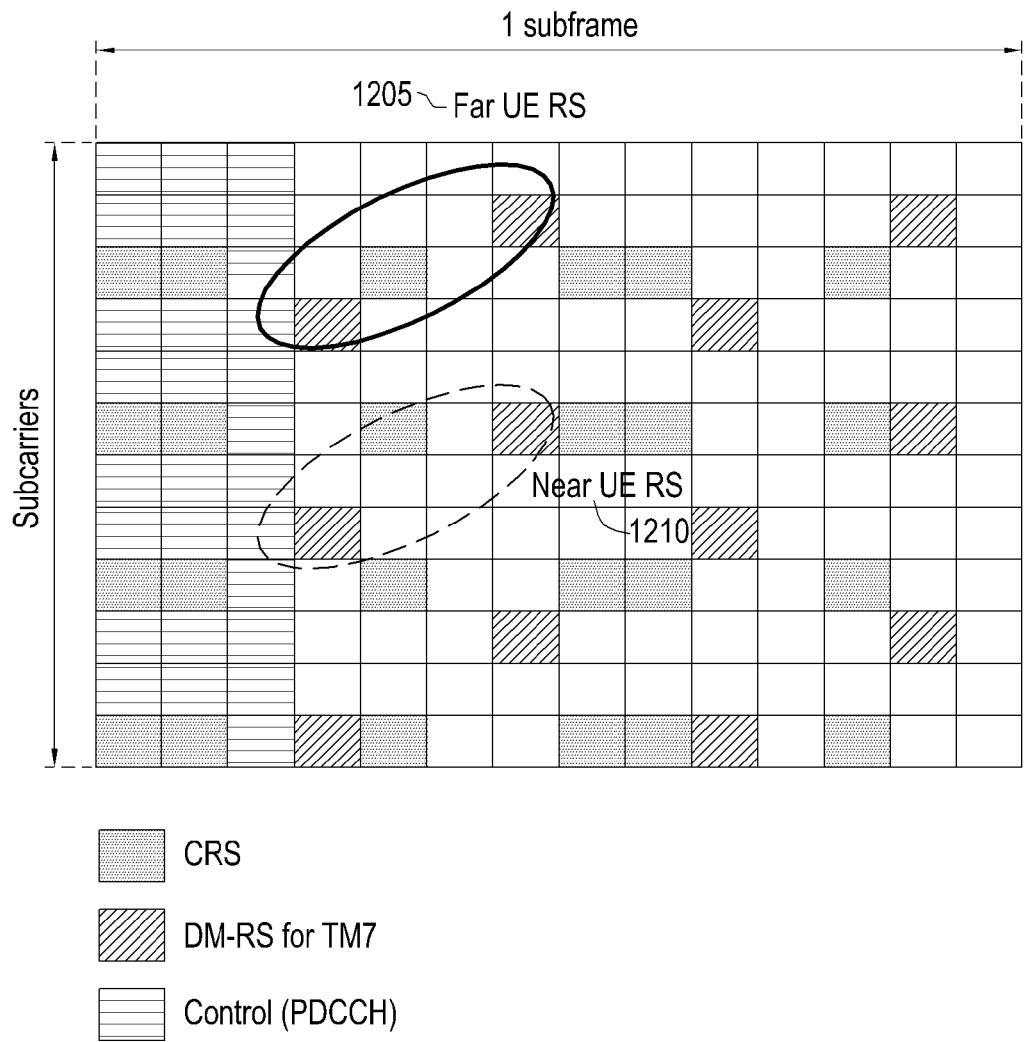

FIGS. 11 and 12 illustrate transmission of UE-specific reference signals for supporting multiuser superposition transmission of UEs that use a transmission mode 7 and a normal CP according to embodiments of the present disclosure.

Referring to FIG. 11, the first three OFDM symbols of one subframe are used for transmitting control information of the PDCCH, and a Cell-specific Reference Signal (CRS) is mapped to predetermined resource elements within the subframe. A DM-RS 1105 for the far UE is transmitted in a first slot of the subframe (some of the first seven OFDM symbols), and a DM-RS 1110 for the near UE is transmitted in a second slot (some of the next seven OFDM symbols).

Referring to FIG. 12, the first three OFDM symbols of one subframe are used for transmitting control information of the PDCCH, and a Cell-specific Reference Signal (CRS) is mapped to predetermined resource elements within the subframe. Second and fourth resource elements of the subframe in the frequency domain are used for transmitting a DM-RS 1205 for the far UE, and sixth and eighth resource elements are used for transmitting a DM-RS 1210 for the near UE.

Figure 13:
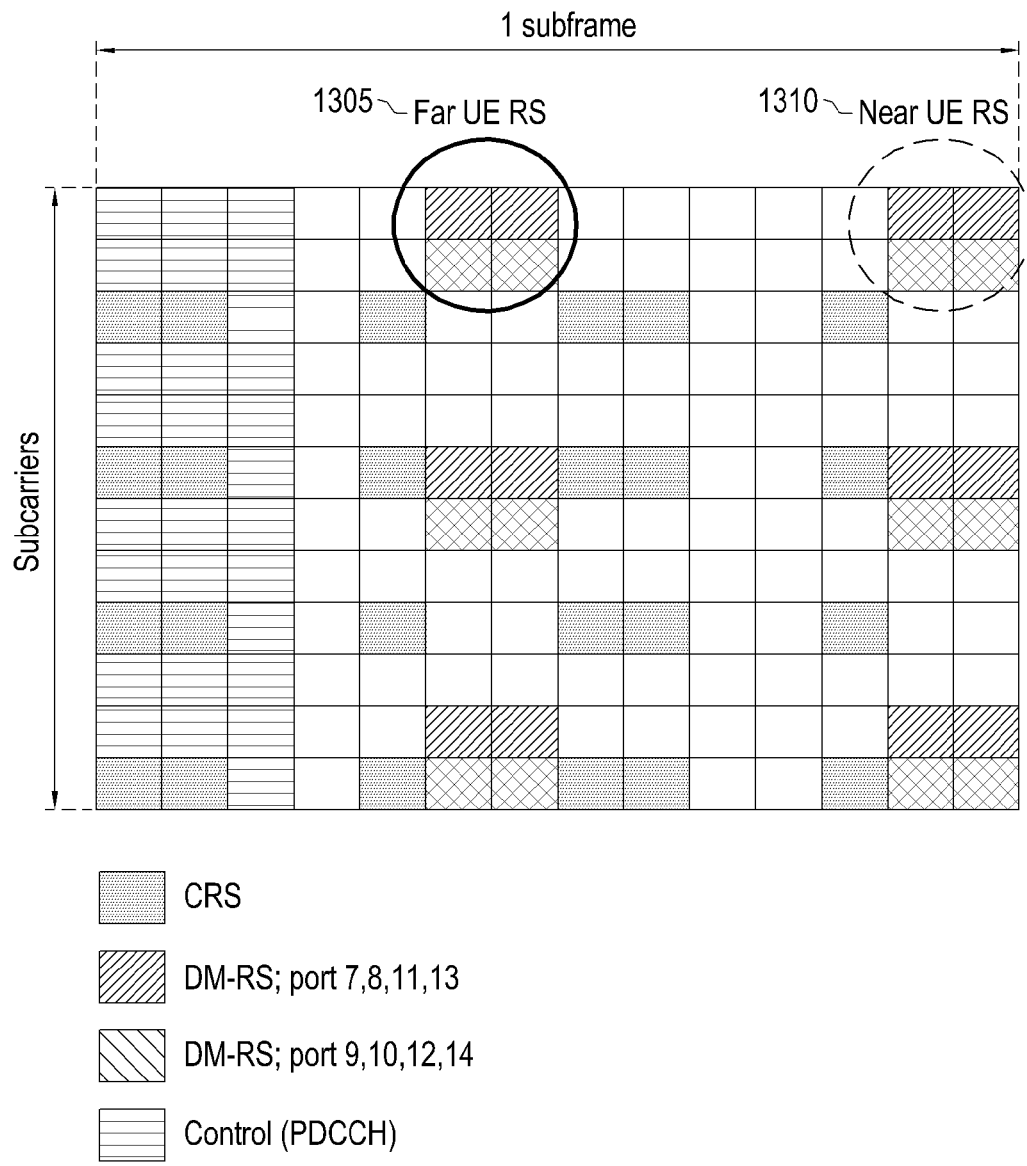
FIGS. 13 and 14 illustrate transmission of UE-specific reference signals for supporting multiuser superposition transmission of UEs each that use one of transmission modes 8 to 10 and a normal CP according to embodiments of the present disclosure.
Figure 14:
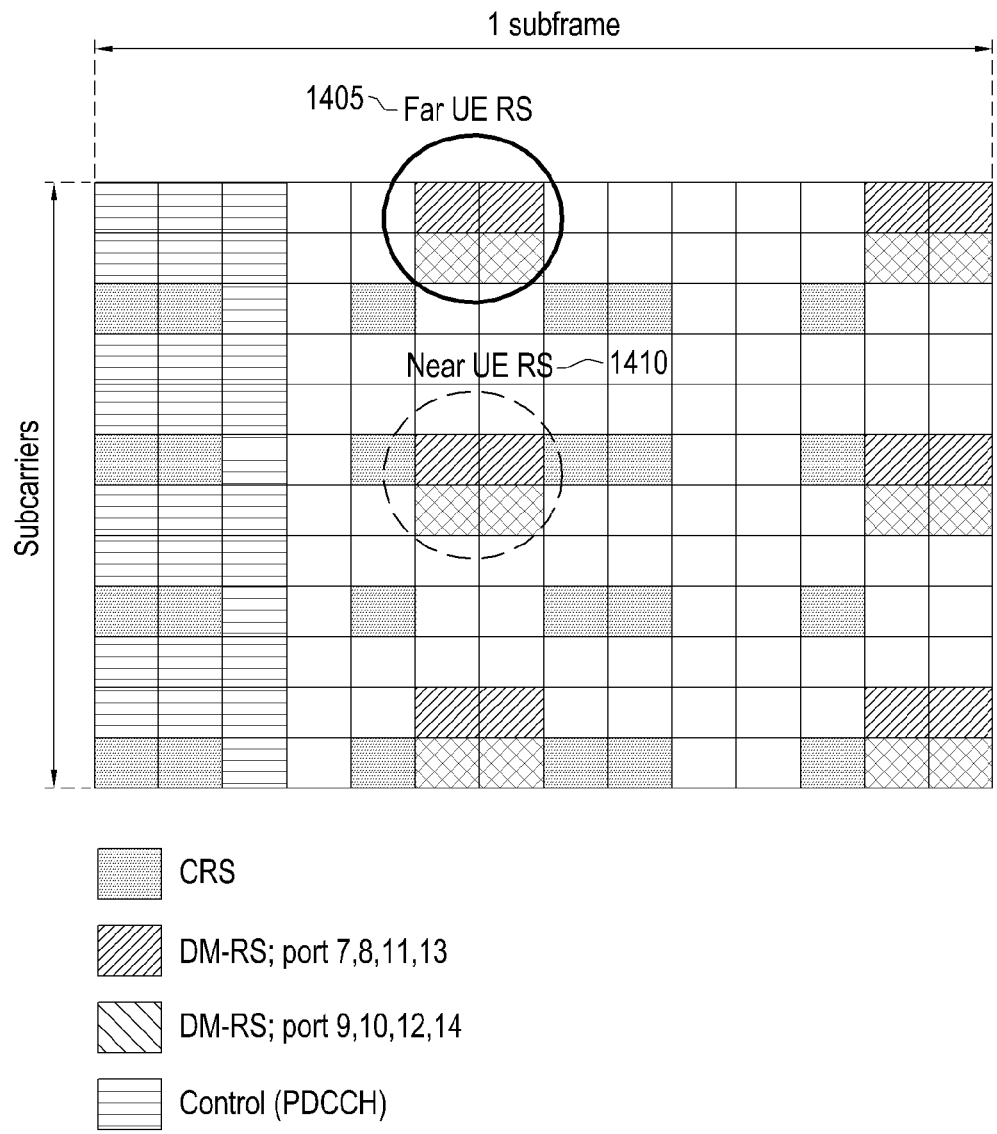

FIGS. 13 and 14 illustrate transmission of UE-specific reference signals for supporting multiuser superposition transmission of UEs each that use one of transmission modes 8 to 10 and a normal CP according to embodiments of the present disclosure.

Referring to FIG. 13, the first three OFDM symbols of one subframe are used for transmitting control information of the PDCCH, and a Cell-specific Reference Signal (CRS) is mapped to predetermined resource elements within the subframe. A DM-RS 1305 for the far UE is transmitted in a first slot of the subframe (the last two symbols among the first seven OFDM symbols), and a DM-RS 1310 for the near UE is transmitted in a second slot (the last two symbols among the next seven OFDM symbols).

Referring to FIG. 14, the first three OFDM symbols of one subframe are used for transmitting control information of the PDCCH, and a Cell-specific Reference Signal (CRS) is mapped to predetermined resource elements within the subframe. First and second resource elements of the subframe in the frequency domain are used for transmitting a DM-RS 1405 for the far UE, and sixth and seventh resource elements are used for transmitting a DM-RS 1410 for the near UE.

Since channel estimation performance compared to OMA can deteriorate when the channel change in the time or frequency domain is serious, the above described embodiments can be applied when the channel is relatively static in the time and frequency domains and acquire a performance gain compared to NOMA while maintaining overhead of the reference signal.

In the following embodiment, DM-RS mapping to maintain channel estimation performance by the DM-RS as much as possible will be described.

The DM-RSs for the far UE are arranged to not overlap the CRS or PDCCH and locations of DM-RSs for the near UE. The DM-RSs for the far UE are distributed as uniformly as possible in a time domain while following the existing design rule for the DM-RS as closely as possible.

That is, a reference signal such as the DM-RS is transmitted by applying power boosting compared to a Physical Downlink Shared Channel (PDSCH) carrying downlink data. Accordingly, when many reference signals are mapped within one OFDM symbol, power to be transmitted to data becomes low and thus performance deterioration can occur. Therefore, it is preferable that the reference signals are uniformly distributed in the time domain.

Hereinafter, a design rule for determining DM-RS locations for the far UE compared to DM-RS locations for near UE will be described.

In equation (1), $r_{n_s}(m)$ denotes a reference signal sequence in a slot $n_s$, and $a_{k,l}^{(p)}$ denotes complex-valued modulation symbols to which the reference signal sequences are mapped in a resource element corresponding to a k-th row and a l-th column in one slot in an antenna port p.

When the UEs configured with MUST use a transmission mode 7 and a normal CP, a reference signal sequence of a DM-RS for the near UE and a location (k, l) of a resource element to which the reference signal sequence is mapped are determined as shown in equation (1).

$$a_{k,l}^{(p)} = r_{n_s}(3 \cdot l' \cdot N_{RB}^{PDSCH} + m') \quad (1)$$

$$k = (k') \bmod N_{sc}^{RB} + N_{sc}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

In equation (1), $N_{RB}^{PDSCH}$ denotes a bandwidth allocated within resource blocks of corresponding data transmission and m' denotes a count of a resource element of a UE-specific reference signal within each OFDM symbol of data transmission. A frequency shift of a cell-specific reference signal is given as $v_{shift} = N_{ID}^{cell} \bmod 3$, where $N_{ID}^{cell}$ denotes a cell ID used in a physical layer. $N_{sc}^{RB}$ denotes a number of successive subcarriers included in one resource blocks in a frequency domain, and $n_{PRB}$ denotes a physical resource block number.

Further, the reference signal sequence of the DM-RS for the far UE corresponding to the near UE in equation (1) and the location of the resource element to which the reference signal sequence is mapped is determined as shown in equation (2).

$$k = (k') \bmod N_{sc}^{RB} + N_{sc}^{RB} \cdot n_{PRB} \quad (2)$$

$$k' = \begin{cases} 4m' + (2 + v_{shift} + \varsigma) \bmod 4 & \text{if } l \in \{3\} \\ 2m'' + (v_{shift} + \varsigma) \bmod 2 & \text{if } l \in \{5\} \\ 4m' + (v_{shift} + \varsigma) \bmod 4 & \text{if } l \in \{6\} \end{cases}$$

$$l = \begin{cases} 5 & l' = 0 \\ 5 & l' = 1 \\ 3 & l' = 2 \\ 6 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$m'' = 0, 1, \ldots, 6N_{RB}^{PDSCH} - 1$$

$$\varsigma \in \{0, 1, 3\}$$

Figure 15:
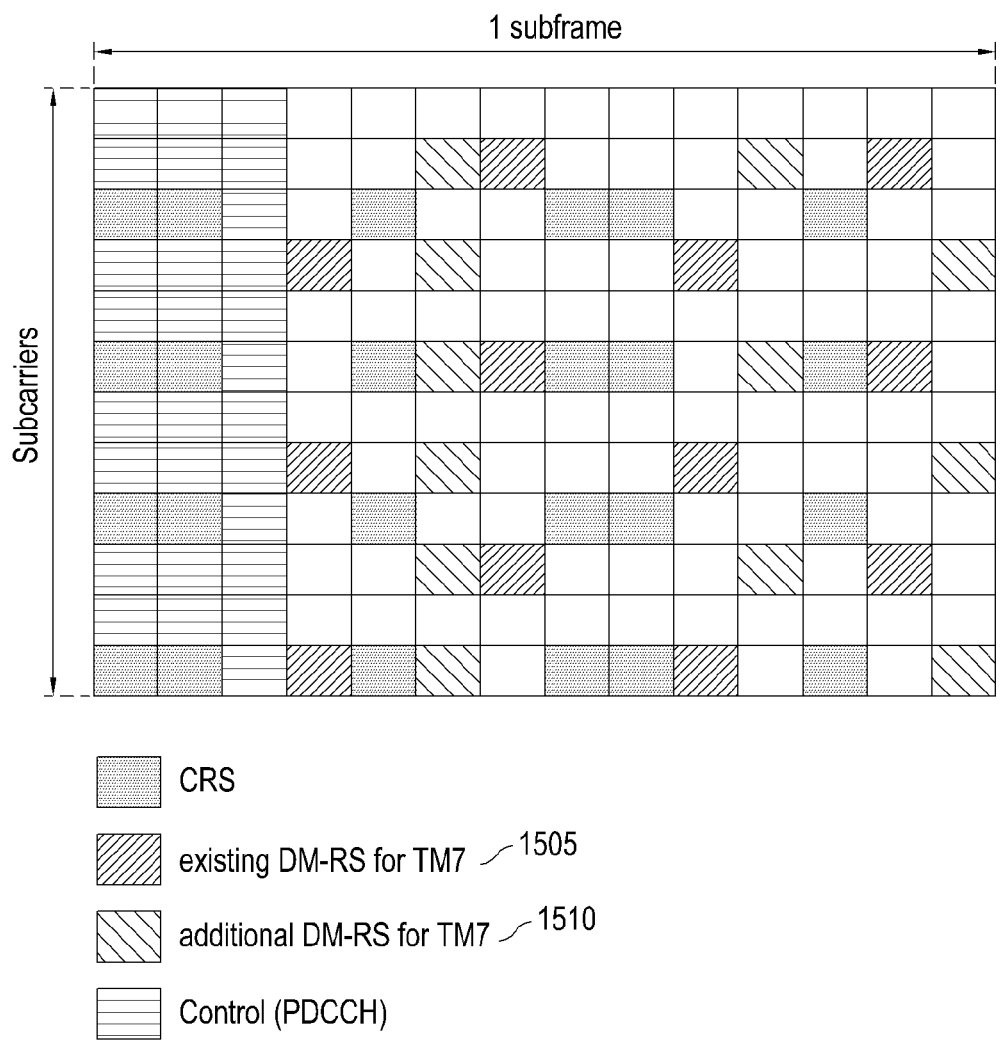
FIG. 15 illustrates transmission of UE-specific reference signals for supporting multiuser superposition transmission of UEs that use a transmission mode 7 and a normal CP according to an embodiment of the present disclosure.

FIG. 15 illustrates transmission of UE-specific reference signals for supporting multiuser superposition transmission of UEs that use a transmission mode 7 and a normal CP according to an embodiment of the present disclosure.

Referring to FIG. 15, the first three OFDM symbols of one subframe are used for transmitting control information of the PDCCH, and a Cell-specific Reference Signal (CRS) is mapped to predetermined resource elements within the subframe. As illustrated in FIG. 15, DM-RSs 1510 additionally transmitted for the far UE are distributed to uniform as possible in the time domain while not being superposed with DM-RSs 1505 for the near UE. Locations of resource elements to which the DM-RSs 1510 additionally transmitted for the far UE are mapped can be determined as shown in equation (2).

When UEs configured with MUST use a transmission mode 7 and an extended CP, reference signal sequences of the DM-RSs for the near UE and locations of resource elements to which the reference signal sequences are mapped are determined as shown in equation (3), and reference signal sequences of the DM-RSs for the far UE and locations of resource elements to which the reference signal sequences are mapped are determined as shown in equation (4).

$$a_{k,l}^{(p)} = r_{n_s}(4 \cdot l' \cdot N_{RB}^{PDSCH} + m') \quad (3)$$
$$k = (k') \bmod N_{sc}^{RB} + N_{sc}^{RB} \cdot n_{PRB}$$
$$k' = \begin{cases} 3m' + v_{shift} & \text{if } l = 4 \\ 3m' + (2 + v_{shift}) \bmod 3 & \text{if } l = 1 \end{cases}$$
$$l = \begin{cases} 4 & l' \in \{0, 2\} \\ 1 & l' = 1 \end{cases}$$
$$l' = \begin{cases} 0 & \text{if } n_s \bmod 2 = 0 \\ 1, 2 & \text{if } n_s \bmod 2 = 1 \end{cases}$$
$$m' = 0, 1, \ldots, 4N_{RB}^{PDSCH} - 1$$

$$k = (k') \bmod N_{sc}^{RB} + N_{sc}^{RB} \cdot n_{PRB} \quad (4)$$
$$k' = \begin{cases} 3m' + (v_{shift} + \varsigma) \bmod 3 & \text{if } l = 5 \\ 3m' + (2 + v_{shift} + \varsigma) \bmod 3 & \text{if } l = 2 \end{cases}$$
$$l = \begin{cases} 5 & l' \in \{0, 2\} \\ 2 & l' = 1 \end{cases}$$
$$l' = \begin{cases} 0 & \text{if } n_s \bmod 2 = 0 \\ 1, 2 & \text{if } n_s \bmod 2 = 1 \end{cases}$$
$$m' = 0, 1, \ldots, 4N_{RB}^{PDSCH} - 1$$
$$\varsigma \in \{0, 1, 2\}$$

Figure 16:
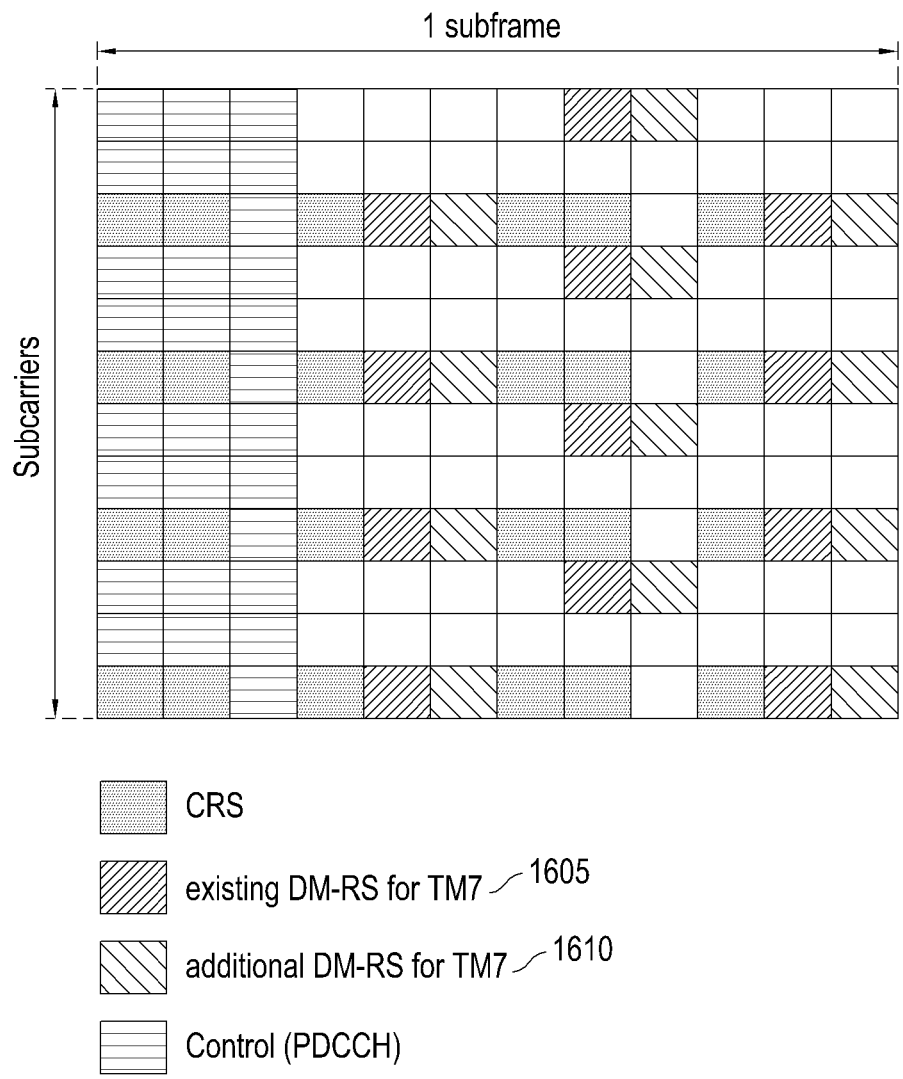
FIG. 16 illustrates transmission of UE-specific reference signals for supporting multiuser superposition transmission of UEs that use a transmission mode 7 and an extended CP according to an embodiment of the present disclosure.

FIG. 16 illustrates transmission of UE-specific reference signals for supporting multiuser superposition transmission of UEs that use a transmission mode 7 and an extended CP according to an embodiment of the present disclosure.

Referring to FIG. 16, the first three OFDM symbols of one subframe are used for transmitting control information of the PDCCH, and a Cell-specific Reference Signal (CRS) is mapped to predetermined resource elements within the subframe. As illustrated in FIG. 16, DM-RSs 1610 additionally transmitted for the far UE are uniformly distributed in the time domain while not being superposed with DM-RSs 1605 for the near UE. Locations of resource elements to which the DM-RSs 1610 additionally transmitted for the far UE are mapped can be determined as shown in equation (4).

When UEs configured with MUST use one of transmission modes 8 to 10 and the normal CP, reference signal sequences of the DM-RSs for the near UE and locations of resource elements to which the reference signal sequences are mapped are determined as shown in equation (5), and reference signal sequences of the DM-RSs for the far UE and locations of resource elements to which the reference signal sequences are mapped are determined as shown in equation (6).

$$a_{k,l}^{(p)} = w_p(l') \cdot r(3 \cdot l' \cdot N_{RB}^{max,DL} + 3 \cdot n_{PRB} + m') \quad (5)$$
$$w_p(i) = \begin{cases} \overline{w}_p(i) & (m' + n_{PRB}) \bmod 2 = 0 \\ \overline{w}_p(3 - i) & (m' + n_{PRB}) \bmod 2 = 1 \end{cases}$$
$$k = 5m' + N_{sc}^{RB} n_{PRB} + k'$$
$$k' = \begin{cases} 1 & p \in \{7, 8, 11, 13\} \\ 0 & p \in \{9, 10, 12, 14\} \end{cases}$$
$$l = l' \bmod 2 + 5$$
$$l' = 0, 1$$
$$m' = 0, 1, 2$$

$$w_p(i) = \begin{cases} \overline{w}_p(i) & (m' + n_{PRB}) \bmod 2 = 0 \\ \overline{w}_p(3 - i) & (m' + n_{PRB}) \bmod 2 = 1 \end{cases} \quad (6)$$
$$k = 5m' + N_{sc}^{RB} n_{PRB} + k'$$
$$k' = \begin{cases} 1, (\varsigma + 1) & \text{if } p \in \{7, 8, 11, 13\} \text{ and } m' = \xi \\ 0, \varsigma & \text{if } p \in \{9, 10, 12, 14\} \text{ and } m' = \xi \\ 1 & \text{if } p \in \{7, 8, 11, 13\} \text{ and } m' = (\xi + 1) \bmod 2, 2 \\ 0 & \text{if } p \in \{7, 8, 11, 13\} \text{ and } m' = (\xi + 1) \bmod 2, 2 \end{cases}$$
$$l = \begin{cases} l' \bmod 2 + 5 & \text{if } n_s \bmod 2 = 0 \\ l' \bmod 2 + 2, l' \bmod 2 + 5 & \text{if } n_s \bmod 2 = 1 \end{cases}$$
$$l' = 0, 1$$
$$m' = 0, 1, 2$$
$$\varsigma \in \{2, 3\}$$
$$\xi \in \{0, 1\}$$

Figure 17:
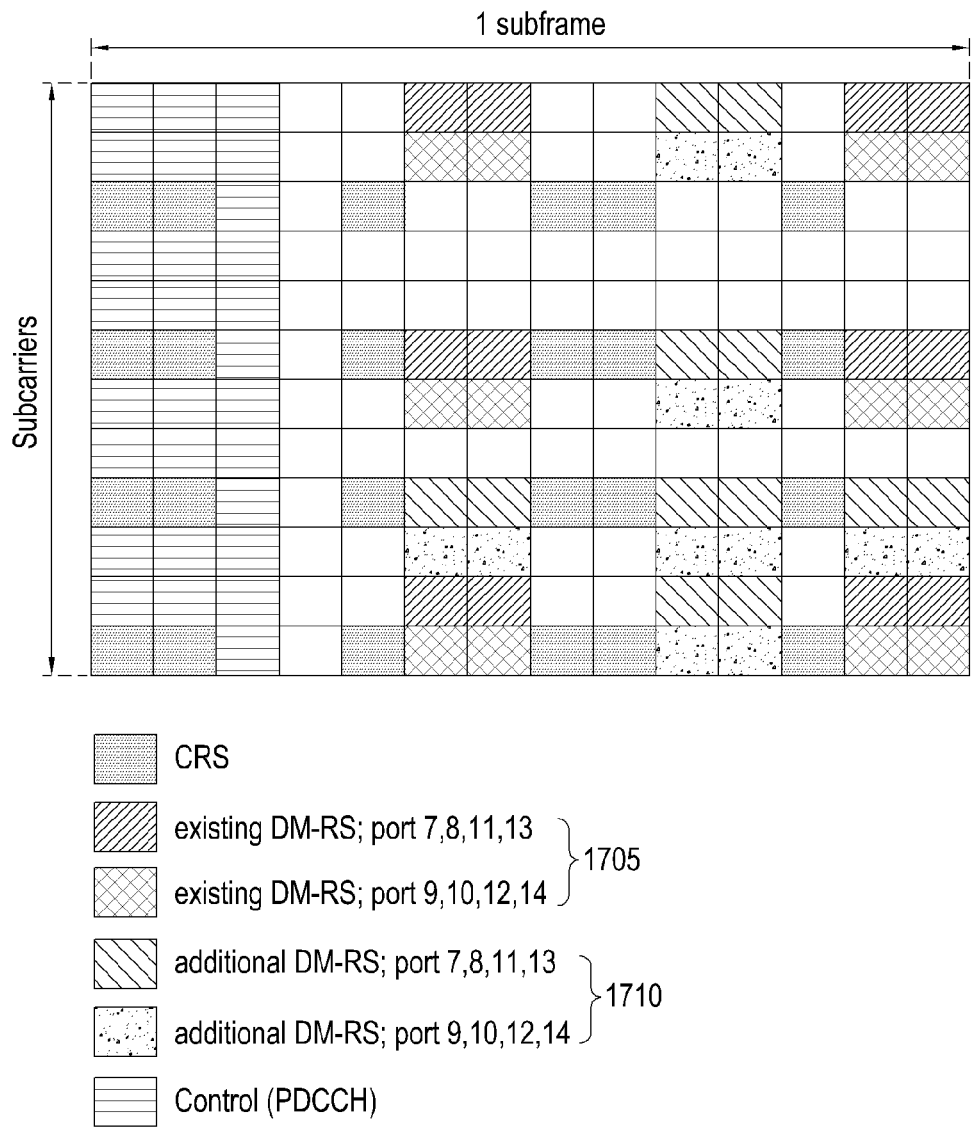
FIG. 17 illustrates transmission of UE-specific reference signals for supporting multiuser superposition transmission of UEs each that use one of transmission modes 8 to 10 and the normal CP according to an embodiment of the present disclosure.

FIG. 17 illustrates transmission of UE-specific reference signals for supporting multiuser superposition transmission of UEs each that use one of transmission modes 8 to 10 and the normal CP according to an embodiment of the present disclosure.

Referring to FIG. 17, the first three OFDM symbols of one subframe are used for transmitting control information of the PDCCH, and a Cell-specific Reference Signal (CRS) is mapped to predetermined resource elements within the subframe. As illustrated in FIG. 17, DM-RSs 1710 additionally transmitted for the far UE are uniformly distributed in the time domain while not being superposed with DM-RSs 1705 for the near UE. Locations of resource elements to which the DM-RSs 1710 additionally transmitted for the far UE are mapped can be determined as shown in equation (6).

When UEs configured with MUST use one of transmission modes 8 to 10 and the extended CP, reference signal sequences of the DM-RSs for the near UE and locations of resource elements to which the reference signal sequences are mapped are determined as shown in equation (7), and reference signal sequences of the DM-RSs for the far UE and locations of resource elements to which the reference signal sequences are mapped are determined as shown in equation (8).

$$a_{k,l}^{(p)} = w_p(l' \bmod 2) \cdot r(4 \cdot l' \cdot N_{RB}^{max,DL} + 4 \cdot n_{PRB} + m') \quad (7)$$
$$w_p(i) = \begin{cases} \overline{w}_p(i) & m' \bmod 2 = 0 \\ \overline{w}_p(1 - i) & m' \bmod 2 = 1 \end{cases}$$
$$k = 3m' + N_{sc}^{RB} n_{PRB} + k'$$
$$k' = \begin{cases} 1 & \text{if } n_s \bmod 2 = 0 \text{ and } p \in \{7, 8\} \\ 2 & \text{if } n_s \bmod 2 = 1 \text{ and } p \in \{7, 8\} \end{cases}$$
$$l = l' \bmod 2 + 4$$
$$l' = 0, 1$$
$$m' = 0, 1, 2, 3$$

-continued $$w_p(i) = \begin{cases} \overline{w}_p(i) & m' \bmod 2 = 0 \\ \overline{w}_p(1-i) & m' \bmod 2 = 1 \end{cases} \quad (8)$$

$$k = 3m' + N_{sc}^{RB} n_{PRB} + k'$$

$$k' = \begin{cases} (1+\varsigma) \bmod 3 & \text{if } n_s \bmod 2 = 0 \text{ and } p \in \{7, 8\} \\ (2+\varsigma) \bmod 3 & \text{if } n_s \bmod 2 = 1 \text{ and } p \in \{7, 8\} \end{cases}$$

$$l = l' \bmod 2 + 4$$

$$l' = 0, 1$$

$$m' = 0, 1, 2, 3$$

$$\varsigma \in \{1, 2\}$$

Figure 18:
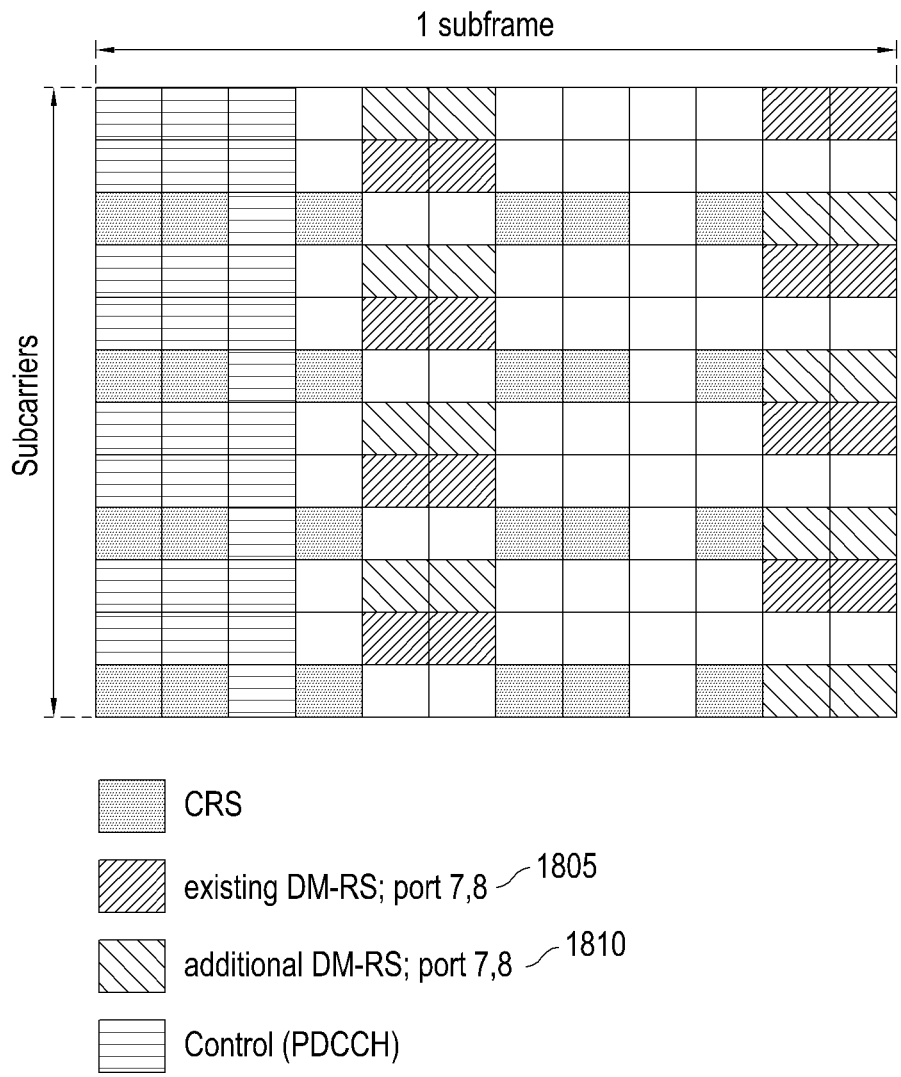
FIG. 18 illustrates transmission of UE-specific reference signals for supporting multiuser superposition transmission of UEs each that use one of transmission modes 8 to 10 and the extended CP according to an embodiment of the present disclosure.

FIG. 18 illustrates transmission of UE-specific reference signals for supporting multiuser superposition transmission of UEs each that use one of transmission modes 8 to 10 and the extended CP according to an embodiment of the present disclosure.

Referring to FIG. 18, the first three OFDM symbols of one subframe are used for transmitting control information of the PDCCH, and a Cell-specific Reference Signal (CRS) is mapped to predetermined resource elements within the subframe. As illustrated in FIG. 18, DM-RSs 1810 additionally transmitted for the far UE are uniformly distributed in the time domain while not being superposed with DM-RSs 1805 for the near UE. Locations of resource elements to which the DM-RSs 1810 additionally transmitted for the far UE are mapped can be determined as shown in equation (8).

The following embodiment describes DM-RS mapping for minimizing an increase in RS overhead while maintaining channel estimation. That is, a compromise between DM-RS mapping of FIGS. 11 to 14 and DM-RS mapping of FIGS. 15 to 19 is applied.

Figure 19:
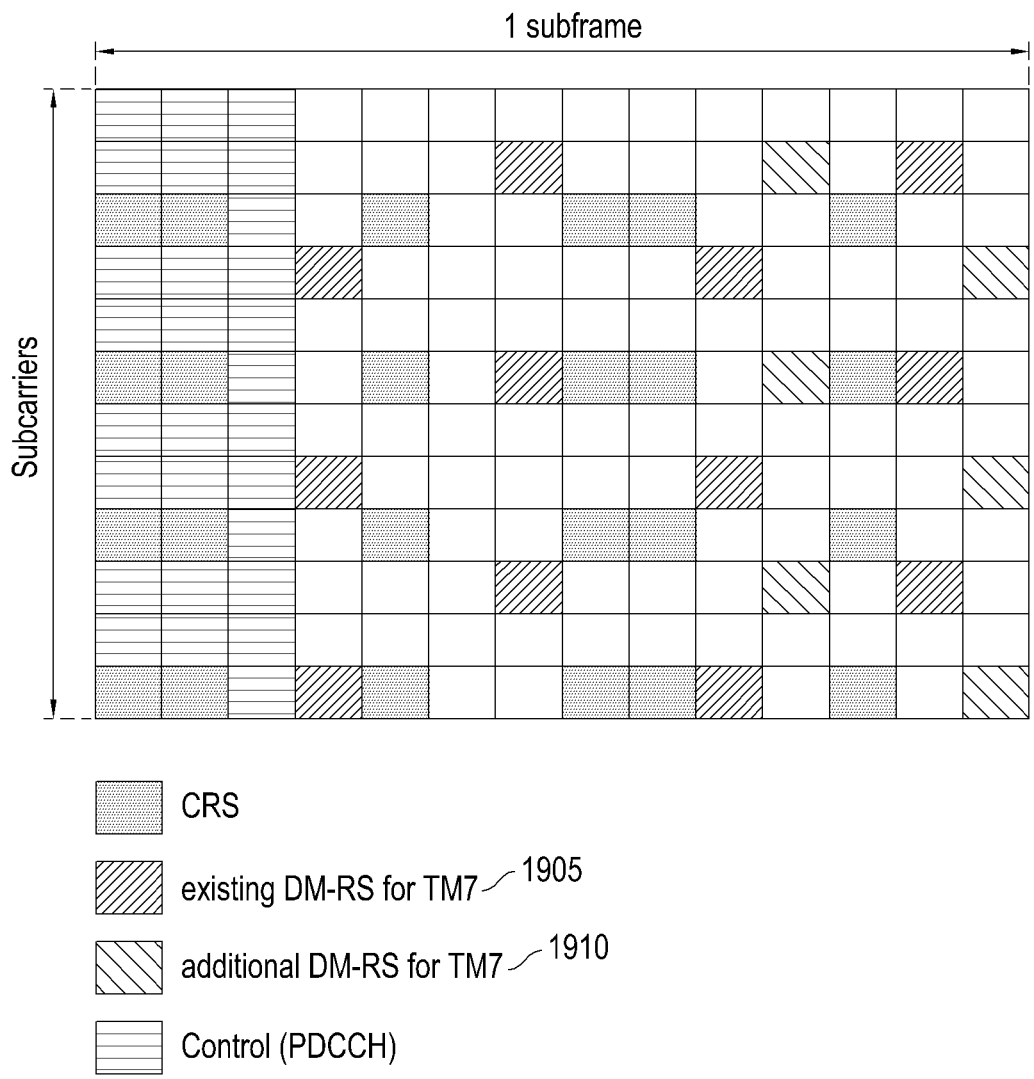
FIG. 19 illustrates transmission of UE-specific reference signals for minimizing an increase in reference signal overhead for UEs that use a transmission mode 7 and the normal CP according to an embodiment of the present disclosure.

FIG. 19 illustrates transmission of UE-specific reference signals for minimizing an increase in reference signal overhead for UEs that use a transmission mode 7 and the normal CP according to an embodiment of the present disclosure.

Referring to FIG. 19, first three OFDM symbols of one subframe are used for transmitting control information of the PDCCH, and a Cell-specific Reference Signal (CRS) is mapped to predetermined resource elements within the subframe. As illustrated in FIG. 19, DM-RSs 1910 additionally transmitted for the far UE are uniformly distributed in the time domain while not being superposed with DM-RSs 1905 for the near UE. Locations of resource elements, to which DM-RSs 1910 for the far UE are mapped, are determined according to equation (2), but only a half of resource elements within one subframe are used for transmitting the DM-RSs 1910. In the illustrated example, the DM-RSs 1910 for the far UE exist only in a second slot.

Figure 20:
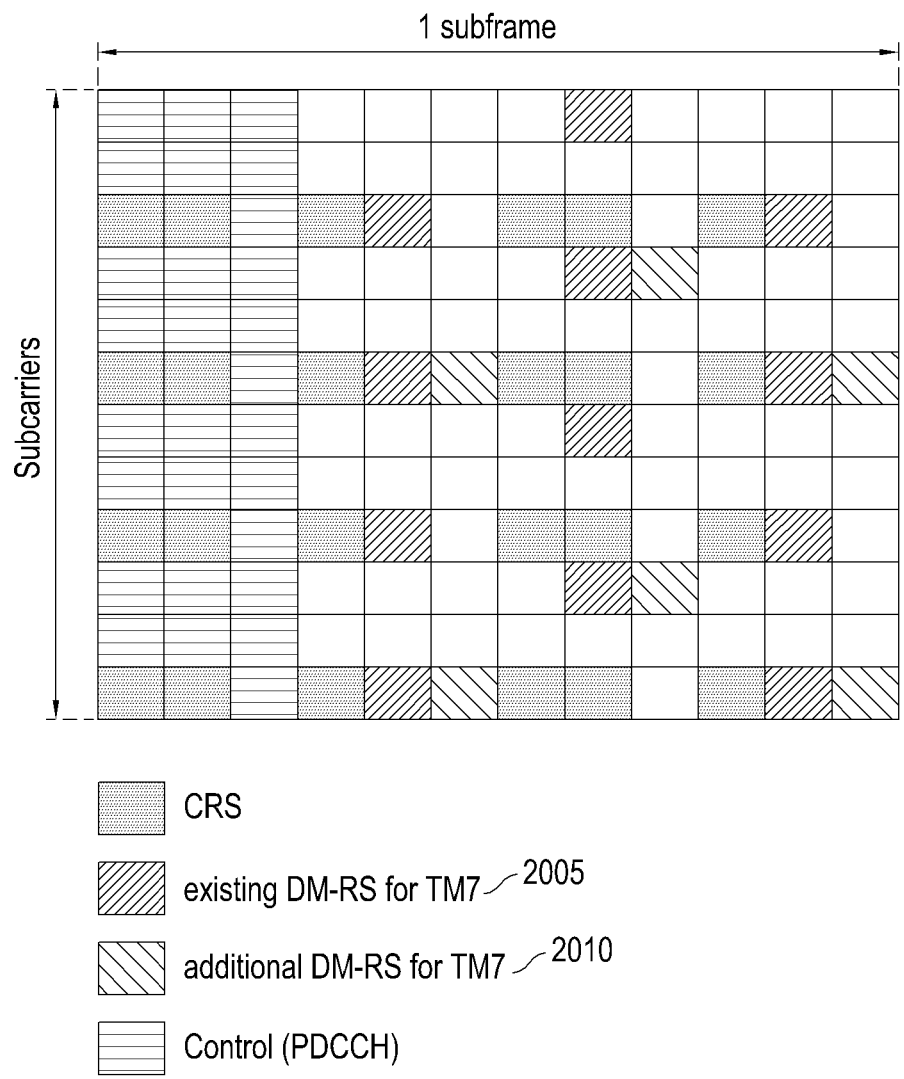
FIG. 20 illustrates transmission of UE-specific reference signals for minimizing an increase in reference signal overhead for UEs that use a transmission mode 7 and the extended CP according to an embodiment of the present disclosure.

FIG. 20 illustrates transmission of UE-specific reference signals for minimizing an increase in reference signal overhead for UEs that use a transmission mode 7 and the extended CP according to an embodiment of the present disclosure.

Referring to FIG. 20, the first three OFDM symbols of one subframe are used for transmitting control information of the PDCCH, and a Cell-specific Reference Signal (CRS) is mapped to predetermined resource elements within the subframe. As illustrated in FIG. 20, DM-RSs 2010 additionally transmitted for the far UE are uniformly distributed in the time domain while not being superposed with DM-RSs 2005 for the near UE. Locations of resource elements, to which the DM-RSs 2010 for the far UE are mapped, are determined according to equation (4), but only a half of resource elements within one OFDM symbol are used for transmitting the DM-RSs 2010.

Figure 21:
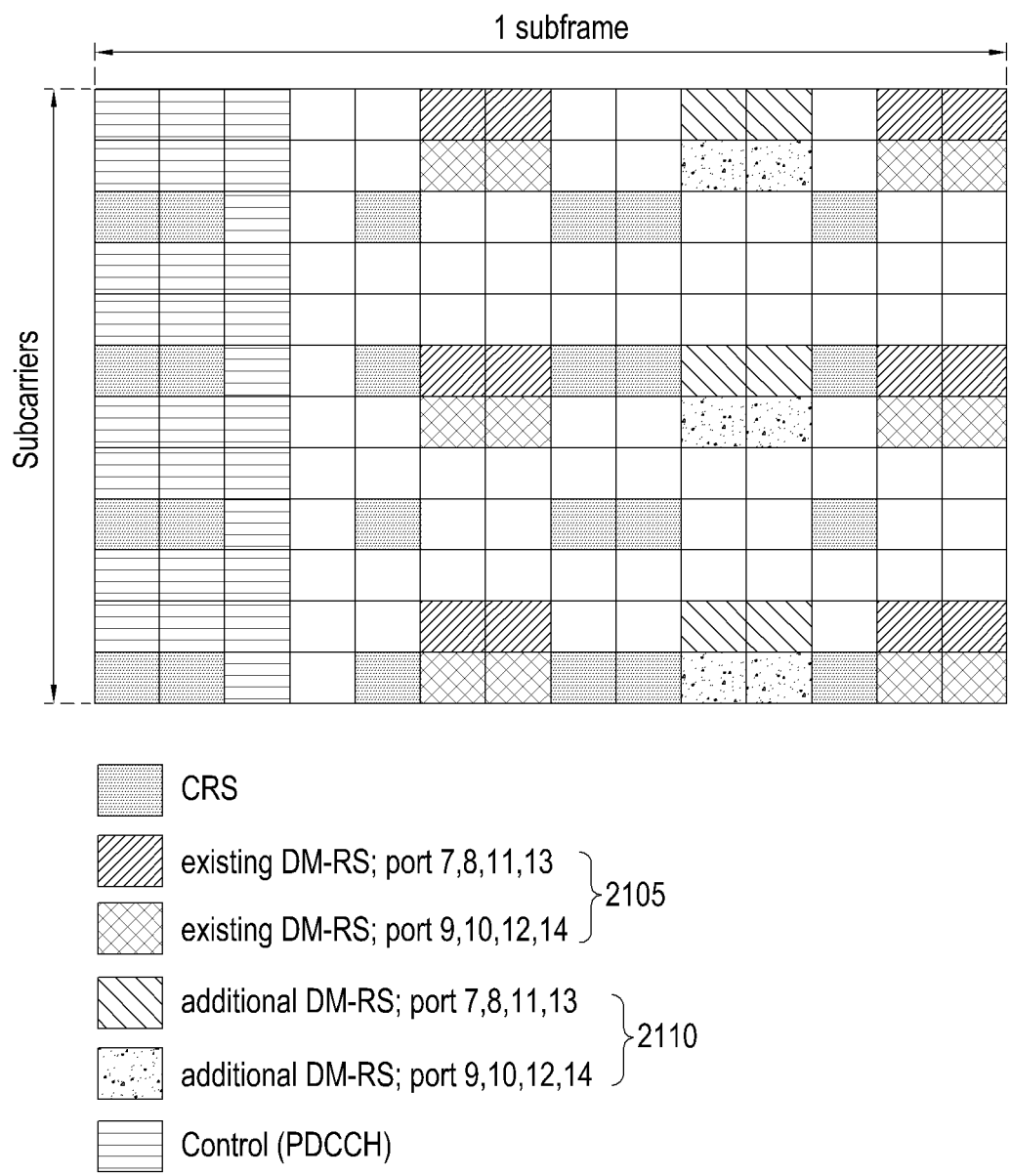
FIG. 21 illustrates transmission of UE-specific reference signals for minimizing an increase in reference signal overhead for UEs each that use one of transmission modes 8 to 10 and the normal CP according to an embodiment of the present disclosure.

FIG. 21 illustrates transmission of UE-specific reference signals for minimizing an increase in reference signal overhead for UEs each that use one of transmission modes 8 to 10 and the normal CP according to an embodiment of the present disclosure.

Referring to FIG. 21, the first three OFDM symbols of one subframe are used for transmitting control information of the PDCCH, and a Cell-specific Reference Signal (CRS) is mapped to predetermined resource elements within the subframe. As illustrated in FIG. 21, DM-RSs 2110 additionally transmitted for the far UE are uniformly distributed in the time domain while not being superposed with DM-RSs 2105 for the near UE. Locations of resource elements, to which the DM-RSs 2110 for the far UE are mapped, are determined according to equation (6), but only a half of resource elements within one subframe are used for transmitting the DM-RSs 2110.

Figure 22:
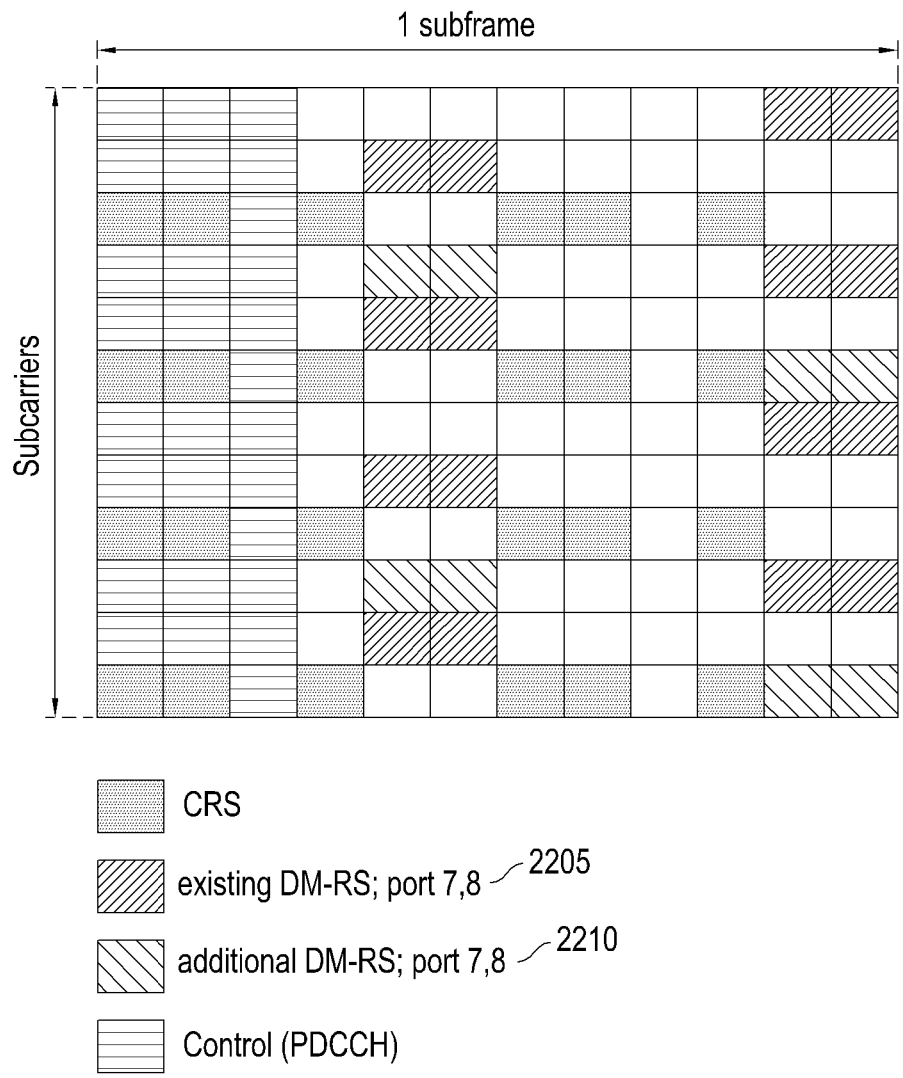
FIG. 22 illustrates transmission of UE-specific reference signals for minimizing an increase in reference signal overhead for UEs each that use one of transmission modes 8 to 10 and the extended CP according to an embodiment of the present disclosure.

FIG. 22 illustrates transmission of UE-specific reference signals for minimizing an increase in reference signal overhead for UEs each that use one of transmission modes 8 to 10 and the extended CP according to an embodiment of the present disclosure.

Referring to FIG. 22, the first three OFDM symbols of one subframe are used for transmitting control information of the PDCCH, and a Cell-specific Reference Signal (CRS) is mapped to predetermined resource elements within the subframe. As illustrated in FIG. 22, DM-RSs 2210 additionally transmitted for the far UE are uniformly distributed in the time domain while not being superposed with DM-RSs 2205 for the near UE. Locations of resource elements, to which the DM-RSs 2210 for the far UE are mapped, are determined according to equation (8), but only a half of resource elements within one OFDM symbol are used for transmitting the DM-RSs 2210.

For example, the DM-RS mapping of FIGS. 15 to 22 can be used when the amount of data transmitted to one pair of UEs and/or when a channel change is large in the time/frequency domain.

Figure 23:
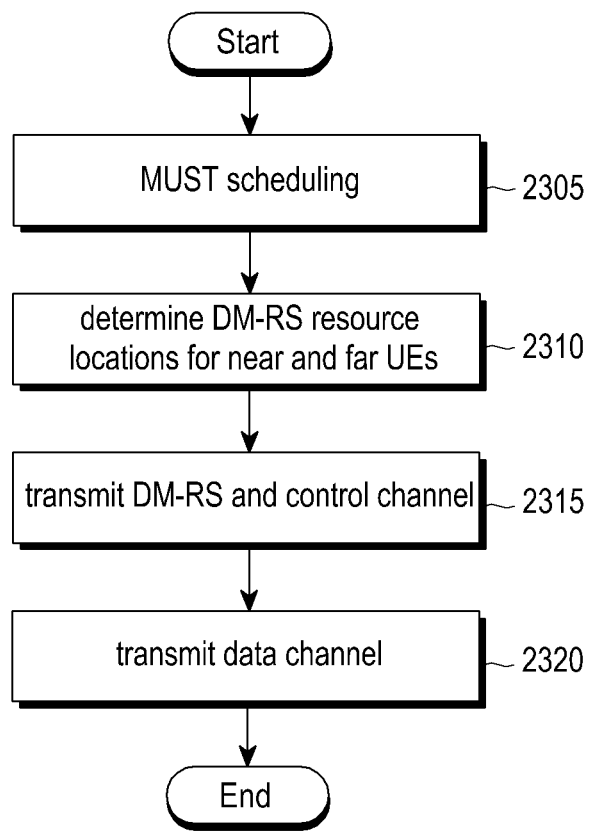
FIG. 23 is a flowchart illustrating a transmission operation of UE-specific reference signals according to an embodiment of the present disclosure.

FIG. 23 is a flowchart illustrating a transmission operation of UE-specific reference signals according to an embodiment of the present disclosure.

Referring to FIG. 23, in process 2305, the BS pairs UEs to be allocated to MUST by performing MUST scheduling for UEs within a cell, and determines MUST-related information for the paired near and far UEs. In process 2310, the BS determines DM-RS resource locations for one UE (that is, near UE) among the paired UEs and determines DM-RS resource locations for at least one remaining UE (that is, far UE) except for the UE. According to an embodiment, DM-RSs for the near UE are mapped to resource locations according to one of equations 1, 3, 5, and 7 or one of FIGS. 11, 13, 15, 17, 19, and 21, and DM-RSs for the far UE are mapped to resource locations according to one of equations 2, 4, 6, and 8 or one of FIGS. 12, 14, 16, 18, 20, and 22.

In process 2315, the BS transmits the DM-RSs for the near UE and the DM-RSs for the far UE on the determined resource locations within the same subframe. Further, the BS transmits control information for the near UE in a resource area of a control channel related to the DM-RS within the subframe through a DCI format of a PDCCH. In process 2320, the BS transmits a data channel related to the control information in a resource area of a data channel indicated by the control information. The data channel is carried on a downlink signal for the near UE and transmitted while being superposed with a downlink signal for the far UE.

Figure 24:
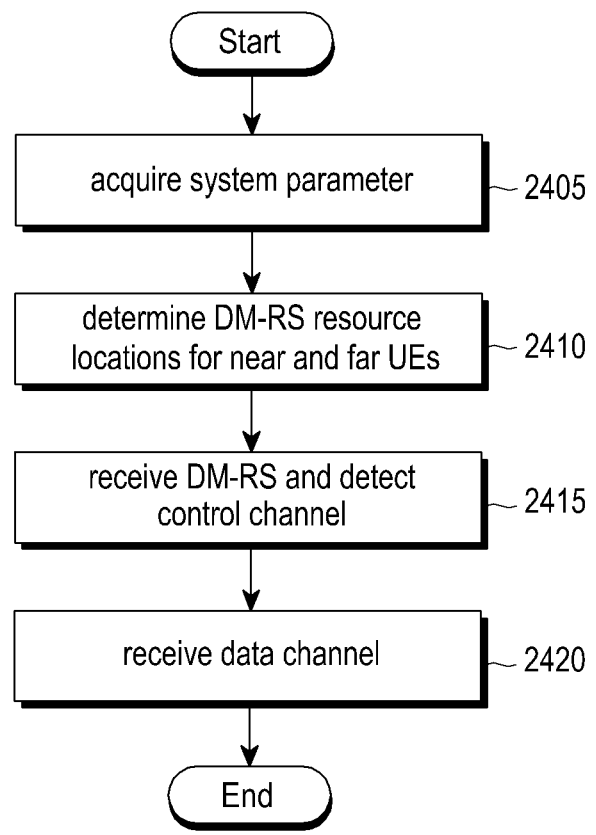
FIG. 24 is a flowchart illustrating a reception operation of UE-specific signals according to an embodiment of the present disclosure.

FIG. 24 is a flowchart illustrating a reception operation of UE-specific signals according to an embodiment of the present disclosure.

Referring to FIG. 24, in process 2405, the UE acquires system parameters and identifies that MUST is scheduled. For example, the UE can receive signaling information required for communication with the BS through an RRC message and also a MUST indication for the UE. The UE can identify that a MUST operation has been instructed through the RRC message. At least some of the system parameters can be acquired through the RRC message.

In process 2410, the UE determines DM-RS resource locations for the UE based on the acquired system parameters and DM-RS resource locations for at least one other UE (that is, far UE) paired for MUST. In process 2415, the UE detects the DM-RSs for the UE and the DM-RSs for the far UE on the determined resource locations within the same subframe. Further, the UE detects control information for the UE in a resource area of a control channel related to the DM-RS within the subframe through a DCI format of a PDCCH. At this time, the UE can further detect an additional DCI format containing MUST-related information for the far UE.

In process 2420, the UE receives a downlink signal in a resource area of a data channel indicated by the control information and removes a signal for the far UE from the downlink signal based on a result of channel estimation of the DM-RS for the far UE. The UE can acquire a signal of the data channel which the UE desires from the downlink signal after the signal for the far UE is removed.

Figure 25:
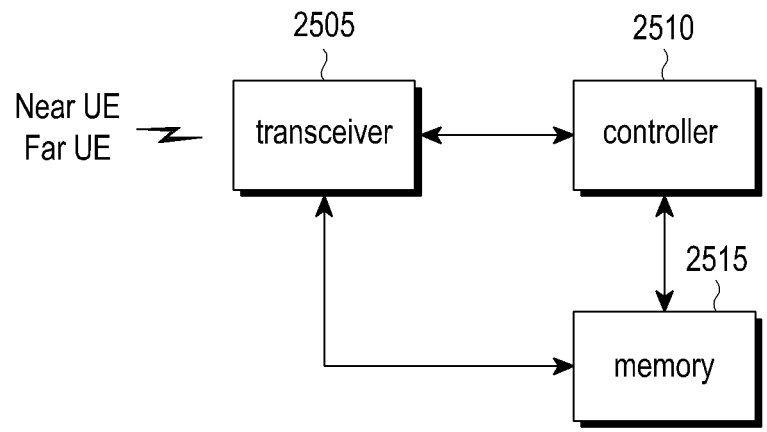
FIG. 25 is a block diagram illustrating an apparatus configuration of the BS that performs an operation according to an embodiment of the present disclosure.

FIG. 25 is a block diagram illustrating an apparatus configuration of the BS that performs an operation according to an embodiment of the present disclosure.

Referring to FIG. 25, the apparatus of the BS includes a transceiver 2505, a controller 2510, and a memory 2515.

The controller 2510 performs scheduling on UEs based on information on UEs within a cell, determines a pair of UEs including at least two UEs that have been MUST-scheduled, and determines MUST-related information for the determined pair of UEs. Further, the controller 2510 can determine DM-RS resource locations for the near UE and the far UE according to at least one of the aforementioned embodiments.

The transceiver 2505 transmits the MUST-related information for the pair of MUST-scheduled UEs to corresponding UEs by using an RRC message and at least one DCI format. For example, the transceiver 2505 can transmit a first DCI format for the near UE and a second DCI format containing MUST-related information of the far UE. A MUST indication for the near UE is transmitted to the near UE through the RRC message.

The memory 2515 stores parameters and program codes required for operations of the controller 2510 and the transceiver 2505.

The description of FIG. 25 is only for the main operations according to the embodiments of the present disclosure for convenience of the description, and the operation of the BS described in embodiments of the present disclosure can be performed even though the operation is not described in FIG. 25.

Figure 26:
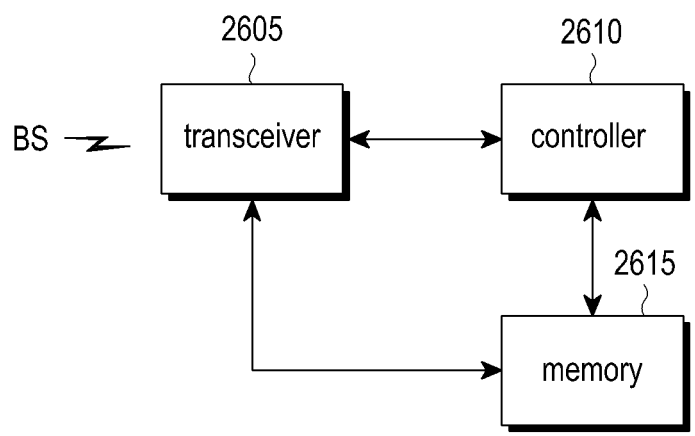
FIG. 26 is a block diagram illustrating an apparatus configuration of the UE that performs operations according to an embodiment of the present disclosure.

FIG. 26 is a block diagram illustrating an apparatus configuration of the UE that performs operations according to an embodiment of the present disclosure.

Referring to FIG. 26, the apparatus of the UE includes a transceiver 2605, a controller 2610, and a memory 2615.

The controller 2610 determines whether MUST is scheduled based on already known information and information collected from a network, and collects MUST-related information for the controller 2610 and the far UE. Further, the controller 2610 can determine DM-RS resource locations for the controller 2610 and the far UE according to at least one of the aforementioned embodiments.

The transceiver 2605 receives an RRC message through a higher layer and/or receives at least one DCI through a PDCCH. The DCI and/or the RRC message include MUST-related information for removing interference of a signal of the far UE. The transceiver 2605 receives DM-RSs for the transceiver 2605 and the far UE at the determined resource locations, and removes the signal of the far UE by using a channel estimation result of the DM-RSs and the MUST-related information from a downlink signal received in a data area.

The memory 2615 stores parameters and program codes required for operations of the controller 2610 and the transceiver 2605.

The description of FIG. 26 is only for the main operations according to the embodiments of the present disclosure for convenience of the description, and the operation of the UE described in embodiments of the present disclosure can be performed even though the operation is not described in FIG. 26.

Particular aspects of the present disclosure can be implemented as a computer-readable code in a computer-readable recording medium. The computer-readable recording medium is a predetermined data storage device which can store data which can be read by a computer system. Examples of the computer readable recording medium can include a read-only memory (ROM), a random access memory (RAM), a CD-ROM, a magnetic tape, a floppy disk, an optical data storage device, and a carrier wave (such as data transmission through the Internet). The computer-readable recording medium can be distributed through computer systems connected to the network, and accordingly the computer-readable code is stored and executed in a distributed manner. Further, functional programs, codes and code segments for achieving the present disclosure may be easily interpreted by programmers skilled in the art which the present disclosure pertains to.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be appreciated that the method according to various embodiments of the present disclosure can be implemented by a computer or portable terminal including a controller and a memory, wherein the memory is one example of machine-readable storage media suitable to store a program or programs including instructions for implementing the embodiments of the present disclosure.

Accordingly, the present disclosure includes a program for a code implementing the apparatus and method described in the appended claims of the specification and a machine (a computer or the like)-readable storage medium for storing the program. Further, the program can be electronically transferred by a predetermined medium such as a communication signal transferred through a wired or wireless connection, and the present disclosure appropriately includes equivalents of the program.

Further, the apparatus according to various embodiments of the present disclosure can receive a program from a program providing apparatus connected to the apparatus wirelessly or through a wire and store the received program. The program providing apparatus can include a memory for storing a program containing instructions for allowing a program processing apparatus to perform a preset content protecting method and information required for the content protecting method, a communication unit for performing wired or wireless communication with a graphic processing apparatus, and a controller for transmitting the corresponding program to a transmission/reception apparatus according to a request of the graphic processing apparatus or automatically.

The embodiments of the present disclosure disclosed herein and shown in the drawings are merely specific examples presented in order to easily describe technical details of the present disclosure and to help the understanding of the present disclosure, and are not intended to limit the scope of the present disclosure. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of supporting multiuser superposition transmission by a base station, the method comprising:
    transmitting, to a first user equipment (UE), a signaling message including an information field indicating that multiuser superposition transmission is configured to the first UE;
    transmitting, to the first UE, first downlink control information (DCI) containing transmission information for the first UE and second DCI containing transmission information for a second UE, which is not the first UE, among at least two UEs associated with the multiuser superposition transmission;
    transmitting, to the second UE, the second DCI; and
    transmitting a first data signal for the first UE according to the first DCI and a second data signal for the second UE according to the second DCI on a same resource region.

2. The method of claim 1, wherein the second DCI includes at least one of modulation and coding scheme (MCS) information applied to transmission of the second data signal for the second UE, a transmission mode allocated to the second UE, and precoding information for the second UE.

3. The method of claim 1, wherein the signaling message further includes at least one of an identifier related to transmission of the data for the second UE and an indicator of a transmission mode allocated to the second UE.

4. The method of claim 1, wherein the signaling message further includes information indicating a location of a subframe at which transmission of the first DCI and the second DCI starts and information indicating a time duration in which the first DCI and the second DCI are transmitted.

5. The method of claim 1, wherein the transmission information included in the second DCI is used for removing interference by a signal for the second UE from a downlink superposition signal received by the first UE.

6. The method of claim 1, further comprising:
    determining resource locations of first reference signals for the first UE and second reference signals for the second UE; and
    transmitting the first reference signals for the first UE and the second reference signals for the second UE at the determined resource locations within a subframe corresponding to the same resource region,
    wherein the resource locations of the second reference signals for the second UE are not superposed with the resource locations of the first reference signals for the first UE in the subframe, and
    the resource locations of the first reference signal and the second reference signal are determined to be uniformly distributed in a time domain.

7. A method of receiving multiuser superposition transmission by an user equipment (UE) associated with multiuser superposition transmission, the method comprising:
    receiving, from a base station, a signaling message including an information field indicating that multiuser superposition transmission is configured to the UE;
    receiving, from the base station, first downlink control information (DCI) containing transmission information for the UE and second DCI containing transmission information for a far UE, which is not the UE, among at least two UEs associated with the multiuser superposition transmission;
    receiving, from the base station, a downlink superposition signal for the UE and the far UE on a same resource region; and
    removing interference by a data signal for the far UE from the received downlink superposition signal based on the transmission information included in the second DCI.

8. The method of claim 7, wherein the second DCI includes at least one of modulation and coding scheme (MCS) information applied to transmission of the data signal for the far UE, a transmission mode allocated to the far UE, and precoding information for the far UE.

9. The method of claim 7, wherein the signaling message further includes at least one of an identifier related to transmission of the data for the far UE and an indicator of a transmission mode allocated to the far UE.

10. The method of claim 7, wherein the signaling message further includes information indicating a location of a subframe at which transmission of the first DCI and the second DCI starts and information indicating a time duration in which the first DCI and the second DCI are transmitted.

11. The method of claim 7, further comprising:
    determining resource locations of first reference signals for the UE and second reference signals for the far UE; and
    detecting the first reference signals for the UE and the second reference signals for the far UE at the determined resource locations within a subframe corresponding to the same resource region,
    wherein the resource locations of the second reference signals for the far UE are not superposed with the resource locations of the first reference signals for the UE in the subframe, and
    the resource locations of the first reference signal and the second reference signal are determined to be distributed as uniformly as possible in a time domain.

12. An apparatus within a BS supporting multiuser superposition transmission, the apparatus comprising:
    a controller configured to:
        generate a signaling message including an information field indicating that multiuser superposition transmission is configured to a first user equipment (UE); and generate first downlink control information (DCI) containing transmission information for the first UE and second DCI containing transmission information for a second UE, which is not the first UE, among at least two UEs associated with the multiuser superposition transmission; and a transmitter configured to:
transmit the signaling message to the first UE, transmits the first DCI and the second DCI to the first UE, and the second DCI to the second UE; and
transmit a first data signal for the first UE according to the first DCI and a second data signal for the second UE according to the second DCI on a same resource region.

13. The apparatus of claim 12, wherein the second DCI includes at least one of modulation and coding scheme (MCS) information applied to transmission of the second data signal for the second UE, a transmission mode allocated to the second UE, and precoding information for the second UE.

14. The apparatus of claim 12, wherein the signaling message further includes at least one of an identifier related to transmission of the data for the second UE and an indicator of a transmission mode allocated to the second UE.

15. The apparatus of claim 12, wherein the signaling message further includes information indicating a location of a subframe at which transmission of the first DCI and the second DCI starts and information indicating a time duration in which the first DCI and the second DCI are transmitted.

16. The apparatus of claim 12, wherein the transmission information included in the second DCI is used for removing interference by a signal for the second UE from a downlink superposition signal received by the first UE.

17. The apparatus of claim 12, wherein the controller is further configured to determine resource locations of first reference signals for the first UE and second reference signals for the second UE,
the transmitter is further configured to transmit the first reference signals for the first UE and the second reference signals for the second UE at the determined resource locations within subframe corresponding to the same resource region,
the resource locations of the second reference signals for the second UE are not superposed with the resource locations of the first reference signals for the first UE in the subframe, and
the resource locations of the first reference signal and the second reference signal are determined to be uniformly distributed in a time domain.

18. An apparatus of a user equipment (UE) associated with multiuser superposition transmission, the apparatus comprising:
a receiver configured to:
receive, from a base station, a signaling message including an information field indicating that multiuser superposition transmission is configured to the UE, receive, from the base station, first downlink control information (DCI) containing transmission information for the UE and second DCI containing transmission information for a far UE, which is not the UE, among at least two UEs associated with the multiuser superposition transmission; and
receive, from the base station, a downlink superposition signal for the UE and the far UE on a same resource region; and
a controller configured to: remove interference by a data signal for the far UE from the received downlink superposition signal based on the transmission information included in the second DCI.

19. The apparatus of claim 18, wherein the second DCI includes at least one of modulation and coding scheme (MCS) information applied to transmission of the data signal for the far UE, a transmission mode allocated to the far UE, and precoding information for the far UE.

20. The apparatus of claim 18, wherein the signaling message further includes at least one of an identifier related to transmission of the data for the far UE and an indicator of a transmission mode allocated to the far UE.

21. The apparatus of claim 18, wherein the signaling message further includes information indicating a location of a subframe at which transmission of the first DCI and the second DCI starts and information indicating a time duration in which the first DCI and the second DCI are transmitted.

22. The apparatus of claim 18, wherein the controller is further configured to determine resource locations of first reference signals for the UE and second reference signals for the far UE, and
the receiver is further configured to detect the first reference signals for the UE and the second reference signals for the far UE at the determined resource locations within a subframe corresponding to the same resource region,
the resource locations of the second reference signals for the far UE are not superposed with the resource locations of the first reference signals for the UE in the subframe, and
the resource locations of the first reference signal and the reference signal are determined to be distributed as uniformly as possible in a time domain.

* * * * *